United States Patent
Blume

(10) Patent No.: US 8,526,502 B2
(45) Date of Patent: Sep. 3, 2013

(54) METHOD AND APPARATUS FOR LINE BASED VERTICAL MOTION ESTIMATION AND COMPENSATION

(75) Inventor: Volker Blume, Tangstedt (DE)

(73) Assignee: Entropic Communications, Inc., San Diego, CA (US)

( * ) Notice: Subject to any disclaimer, the term of this patent is extended or adjusted under 35 U.S.C. 154(b) by 410 days.

(21) Appl. No.: 12/677,508

(22) PCT Filed: Aug. 5, 2008

(86) PCT No.: PCT/IB2008/053146
§ 371 (c)(1),
(2), (4) Date: Jun. 4, 2010

(87) PCT Pub. No.: WO2009/034488
PCT Pub. Date: Mar. 19, 2009

(65) Prior Publication Data
US 2010/0238355 A1    Sep. 23, 2010

(30) Foreign Application Priority Data

Sep. 10, 2007  (EP) .................................. 07017665

(51) Int. Cl.
*H04N 7/12* (2006.01)
(52) U.S. Cl.
USPC .................................................. 375/240.16
(58) Field of Classification Search
None
See application file for complete search history.

(56) References Cited

U.S. PATENT DOCUMENTS

| | | | |
|---|---|---|---|
| 4,924,310 A * | 5/1990 | von Brandt | 375/240.16 |
| 5,162,907 A * | 11/1992 | Keating et al. | 375/240.16 |
| 5,177,608 A | 1/1993 | Ohki et al. | |
| 5,184,219 A * | 2/1993 | Cho | 375/240.01 |
| 5,193,001 A | 3/1993 | Kerdranvrat | |
| 5,363,146 A * | 11/1994 | Saunders et al. | 348/699 |
| 5,440,344 A * | 8/1995 | Asamura et al. | 375/240.04 |

(Continued)

FOREIGN PATENT DOCUMENTS

| | | |
|---|---|---|
| EP | 0735746 | 10/1996 |
| EP | 0765571 | 4/1997 |

(Continued)

OTHER PUBLICATIONS

Chen, Han, Feng et al.: "Smooth frame insertion method for motion-blur reduction in LCDs," Eurodisplay, XX, XX, Jan. 1, 2005, pp. 359-361, XP009087929.

Chen, Mei-Juan et al.: "One dimensional full search motion estimation algorithm for video coding," Oct. 1, 1994, IEEE Transactions on Circuits and Systems for Video Technology, IEEE Service Center, Piscataway, NJ, US, pp. 504-509, XP000471051, ISSN: 1051-8215.

De Haan, Gerard: "IC for motion-compensated de-interlacing, noise reduction, and picture-rate conversion," IEEE Transactions on Consumer Electronics, IEEE Service Center, New York, NY, US, vol. 45, No. 3, Aug. 1, 1999, pp. 617-624, XP011083780, ISSN: 0098-3063.

(Continued)

*Primary Examiner* — Sath V Perungavoor
*Assistant Examiner* — Kehinde O Abimbola
(74) *Attorney, Agent, or Firm* — Bruce Greenhaus; Richard Bachand; Duane Morris LLP

(57) ABSTRACT

The present invention is related to line based vertical motion estimation and vertical motion compensation in consecutive frames of a motion picture, wherein the picture is divided in at least one region, and wherein: in a first summation luminance values for each line of the at least one region of a previous frame are summed, wherein the first summation of luminance values results in a previous accumulation profile; in a second summation of luminance values of for each line of the at least one region of a current frame are summed, wherein said second summation of luminance values results in a current accumulation profile; and wherein a vertical motion vector is derived by use of the previous accumulation profile and of the current accumulation profile.

9 Claims, 24 Drawing Sheets

(56) References Cited

U.S. PATENT DOCUMENTS

| | | | |
|---|---|---|---|
| 5,604,546 A * | 2/1997 | Iwata | 348/699 |
| 5,703,646 A * | 12/1997 | Oda | 375/240.13 |
| 5,703,793 A * | 12/1997 | Wise et al. | 382/232 |
| 5,719,631 A * | 2/1998 | Pandel | 375/240.15 |
| 5,740,460 A * | 4/1998 | Wise et al. | 348/473 |
| 5,768,438 A * | 6/1998 | Etoh | 382/251 |
| 5,768,629 A * | 6/1998 | Wise et al. | 710/68 |
| 5,798,719 A * | 8/1998 | Wise et al. | 341/67 |
| 5,798,948 A * | 8/1998 | Rashkovskiy et al. | 348/620 |
| 5,801,973 A * | 9/1998 | Wise et al. | 708/203 |
| 5,805,178 A | 9/1998 | Silverbrook | |
| 5,805,227 A * | 9/1998 | Gi-Hwan | 375/240.17 |
| 5,821,885 A * | 10/1998 | Wise et al. | 341/67 |
| 5,828,907 A * | 10/1998 | Wise et al. | 710/68 |
| 5,829,007 A * | 10/1998 | Wise et al. | 711/5 |
| 5,835,792 A * | 11/1998 | Wise et al. | 710/68 |
| 5,878,273 A * | 3/1999 | Wise et al. | 710/5 |
| 5,963,154 A * | 10/1999 | Wise et al. | 341/67 |
| 5,984,512 A * | 11/1999 | Jones et al. | 709/219 |
| 5,995,727 A * | 11/1999 | Wise et al. | 709/247 |
| 6,018,366 A * | 1/2000 | Asai et al. | 375/240.18 |
| 6,034,734 A | 3/2000 | De Haan et al. | |
| 6,040,865 A * | 3/2000 | Kato et al. | 375/240.16 |
| 6,040,875 A * | 3/2000 | Boice et al. | 348/595 |
| 6,057,884 A * | 5/2000 | Chen et al. | 375/240.16 |
| 6,075,899 A * | 6/2000 | Yoshioka et al. | 382/233 |
| 6,078,618 A | 6/2000 | Yokoyama et al. | |
| 6,084,641 A * | 7/2000 | Wu | 348/722 |
| 6,101,222 A * | 8/2000 | Dorricott | 375/240 |
| 6,108,047 A | 8/2000 | Chen | |
| 6,119,213 A * | 9/2000 | Robbins | 711/202 |
| 6,175,592 B1 * | 1/2001 | Kim et al. | 375/240.16 |
| 6,217,234 B1 * | 4/2001 | Dewar et al. | 709/247 |
| 6,240,211 B1 | 5/2001 | Mancuso et al. | |
| 6,317,519 B2 * | 11/2001 | Dusseux | 382/237 |
| 6,360,014 B1 * | 3/2002 | Boon | 382/233 |
| 6,360,015 B1 * | 3/2002 | Bakhmutsky et al. | 382/236 |
| 6,400,764 B1 * | 6/2002 | Bakhmutsky | 375/240.16 |
| 6,466,625 B1 * | 10/2002 | Kobayashi et al. | 375/240.29 |
| 6,539,058 B1 * | 3/2003 | Pearlstein et al. | 375/240.25 |
| 6,539,120 B1 * | 3/2003 | Sita et al. | 382/233 |
| 6,714,594 B2 * | 3/2004 | Dimitrova et al. | 375/240.16 |
| 6,788,347 B1 * | 9/2004 | Kim et al. | 348/441 |
| 6,799,246 B1 * | 9/2004 | Wise et al. | 711/117 |
| 6,823,015 B2 * | 11/2004 | Hall et al. | 375/240.24 |
| 6,825,886 B2 * | 11/2004 | Kobayashi et al. | 348/405.1 |
| 6,831,948 B1 * | 12/2004 | Van Dijk et al. | 375/240.12 |
| 6,836,273 B1 | 12/2004 | Kadono | |
| 6,928,232 B2 * | 8/2005 | Hibi et al. | 386/241 |
| 7,129,987 B1 | 10/2006 | Westwater | |
| 7,142,251 B2 * | 11/2006 | Sha et al. | 348/557 |
| 7,308,029 B2 * | 12/2007 | Boice et al. | 375/240.15 |
| 7,343,045 B2 * | 3/2008 | Onuma et al. | 382/239 |
| 7,366,237 B2 * | 4/2008 | Yu et al. | 375/240.16 |
| 7,447,337 B2 * | 11/2008 | Zhang et al. | 382/107 |
| 7,486,730 B2 * | 2/2009 | Van Dijk et al. | 375/240.01 |
| RE40,679 E * | 3/2009 | Oda | 375/240.13 |
| 7,848,425 B2 * | 12/2010 | Cho et al. | 375/240.16 |
| 7,881,377 B2 * | 2/2011 | Arimura et al. | 375/240.12 |
| 7,916,793 B2 * | 3/2011 | Nakajima et al. | 375/240.26 |
| 7,991,055 B2 * | 8/2011 | Cancemi et al. | 375/240.27 |
| 8,036,263 B2 * | 10/2011 | Wang et al. | 375/240.01 |
| 8,098,729 B2 * | 1/2012 | Boice et al. | 375/240.15 |
| 2001/0002922 A1 | 6/2001 | Hayashi | |
| 2001/0016076 A1 * | 8/2001 | Dusseux | 382/237 |
| 2002/0006163 A1 * | 1/2002 | Hibi et al. | 375/240.16 |
| 2002/0037053 A1 * | 3/2002 | Kim | 375/240.12 |
| 2002/0141503 A1 * | 10/2002 | Kobayashi et al. | 375/240.27 |
| 2002/0150247 A1 * | 10/2002 | Linnartz et al. | 380/205 |
| 2002/0186768 A1 * | 12/2002 | Dimitrova et al. | 375/240.12 |
| 2002/0196362 A1 | 12/2002 | Yang et al. | |
| 2003/0138048 A1 * | 7/2003 | Hall et al. | 375/240.24 |
| 2003/0161400 A1 | 8/2003 | Dinerstein et al. | |
| 2004/0091044 A1 * | 5/2004 | Nakajima et al. | 375/240.01 |
| 2004/0109503 A1 * | 6/2004 | Lee | 375/240.16 |
| 2004/0150747 A1 * | 8/2004 | Sita | 348/558 |
| 2004/0179599 A1 * | 9/2004 | Lakshmanan et al. | 375/240.12 |
| 2004/0190625 A1 * | 9/2004 | He et al. | 375/240.18 |
| 2004/0228538 A1 * | 11/2004 | Onuma et al. | 382/239 |
| 2005/0013374 A1 * | 1/2005 | Kim | 375/240.21 |
| 2005/0053136 A1 * | 3/2005 | Yu et al. | 375/240.16 |
| 2005/0135479 A1 * | 6/2005 | Lee | 375/240.12 |
| 2005/0135687 A1 * | 6/2005 | Boice et al. | 382/239 |
| 2005/0206784 A1 * | 9/2005 | Li et al. | 348/441 |
| 2005/0237433 A1 * | 10/2005 | Van Dijk et al. | 348/702 |
| 2005/0249286 A1 | 11/2005 | Nicolas | |
| 2005/0281334 A1 * | 12/2005 | Walker et al. | 375/240.16 |
| 2006/0023119 A1 | 2/2006 | Han | |
| 2006/0088107 A1 * | 4/2006 | Cancemi et al. | 375/240.27 |
| 2006/0133493 A1 * | 6/2006 | Cho et al. | 375/240.16 |
| 2006/0164543 A1 * | 7/2006 | Richardson et al. | 348/390.1 |
| 2006/0176962 A1 * | 8/2006 | Arimura et al. | 375/240.24 |
| 2006/0285586 A1 * | 12/2006 | Westerman | 375/240 |
| 2007/0040935 A1 | 2/2007 | Lee et al. | |
| 2007/0147504 A1 * | 6/2007 | Wang et al. | 375/240.13 |
| 2007/0296655 A1 | 12/2007 | Jiang et al. | |
| 2008/0055477 A1 | 3/2008 | Wu et al. | |
| 2008/0056389 A1 | 3/2008 | Chiang et al. | |
| 2008/0095232 A1 * | 4/2008 | Boice et al. | 375/240.12 |
| 2008/0144716 A1 * | 6/2008 | De Haan | 375/240.16 |
| 2008/0159409 A1 * | 7/2008 | Yu et al. | 375/240.26 |
| 2008/0204598 A1 * | 8/2008 | Maurer et al. | 348/584 |
| 2009/0034622 A1 | 2/2009 | Huchet et al. | |
| 2009/0086814 A1 | 4/2009 | Leontaris et al. | |
| 2009/0135910 A1 | 5/2009 | Jung | |
| 2010/0020231 A1 | 1/2010 | Gong et al. | |
| 2010/0238355 A1 * | 9/2010 | Blume | 348/607 |
| 2010/0265272 A1 | 10/2010 | Bae et al. | |
| 2010/0271554 A1 * | 10/2010 | Blume | 348/699 |
| 2010/0277644 A1 * | 11/2010 | Blume | 348/452 |
| 2011/0013081 A1 | 1/2011 | Wredenhagen et al. | |
| 2011/0038411 A1 * | 2/2011 | Demos | 375/240.03 |
| 2011/0090960 A1 | 4/2011 | Leontaris et al. | |
| 2011/0128439 A1 | 6/2011 | Chang | |
| 2011/0205438 A1 * | 8/2011 | Blume | 348/607 |
| 2011/0242423 A1 | 10/2011 | Lee et al. | |
| 2011/0273441 A1 | 11/2011 | Shin | |
| 2011/0286519 A1 * | 11/2011 | Demos | 375/240.03 |
| 2012/0007895 A1 | 1/2012 | Kim et al. | |
| 2012/0013601 A1 | 1/2012 | Park et al. | |
| 2012/0056871 A1 | 3/2012 | Chen | |
| 2012/0062552 A1 | 3/2012 | Bae et al. | |
| 2012/0068999 A1 | 3/2012 | Yoo et al. | |

FOREIGN PATENT DOCUMENTS

| | | |
|---|---|---|
| EP | 0874523 | 10/1998 |
| EP | 0765573 | 6/1999 |
| EP | 0765572 | 6/2000 |
| EP | 1128678 | 8/2001 |
| EP | 1422929 | 5/2004 |
| GB | 2401502 | 11/2004 |
| WO | 9632812 | 10/1996 |
| WO | WO 96/32812 | 10/1996 |
| WO | WO 2006/124237 | 11/2006 |

OTHER PUBLICATIONS

Ojo, Olukayode Anthony et al.: "Robust motioncompensated video upconversion," 19971101, vol. 43, No. 4, Nov. 1, 1997, pp. 1045-1056, XP011008517.

PCT/IB2008/053147, International Search Report mailed Apr. 15, 2009.

PCT/IB2008/053127, International Search Report mailed Mar. 19, 2009.

PCT/IB2008/053373, International Search Report mailed Jun. 19, 2009.

International Search Report for PCT/IB2008/053146 mailed Oct. 6, 2009.

* cited by examiner

METHOD AND APPARATUS FOR LINE BASED VERTICAL MOTION ESTIMATION AND COMPENSATION

FIELD OF THE INVENTION

The present invention is related to a method and an apparatus for the processing of a video signal for line based vertical motion estimation and vertical motion compensation.

TECHNICAL BACKGROUND OF THE INVENTION

Hereinafter, the present invention and its underlying problem is described with regard to the processing of a video signal for line based motion estimation and motion compensation within a video processing apparatus such as a microprocessor or microcontroller having line memory devices, whereas, it should be noted, that the present invention is not restricted to this application, but can also be used for other video processing apparatus.

The present invention relates to a motion estimation and compensation device and more particularly to a motion estimation and motion compensation device that estimates motion vectors and performs motion compensated predictions of an interlaced sequence of chrominance sub-sampled video frames.

In digital compression coding standards of the Moving Picture Experts Group (MPEG) are widely used today in these fields of for example DVD videos and digital TV broadcasting to record or transmit large amounts of motion image data of a high quality. Such video compression standards of this MPEG-family, such as the MPEG-1, MPEG-2, MPEG-4, H.261, H.263, H.264 standards divide an input image into several macroblocks. Each of these macroblocks is encoded in each of the interprediction and intraprediction encoding mode available the bit rates required for encoding the macroblock and the rate distortion (RD) costs of the various encoding modes are compared. Then an appropriate encoding mode is selected according to the result of comparison and the macroblock is encoded using the selected encoding mode.

Using interprediction, the motion of a macroblock of a current frame of a whole motion picture, which comprises several consecutive frames, is predicted by referring to a macroblock of a neighboring frame of the current frame to reduce temporal redundant components using similarities between the video frames. In interprediction motion estimation and motion compensation are performed in units of a macroblock.

Motion estimation involves searching a predetermined region or area (so-called search area) of a reference frame extending from a position corresponding to a current macroblock to select an area having the smallest distance with the current macroblock as a most similar area and outputting a special difference between the most similar area and the current macroblock as a motion vector. Motion compensation involves reading the most similar area from the reference frame using the motion vector obtained through motion estimation and generating an interpredicted block. In motion estimation, the current macroblock data and the search area data of the reference frame must be read from an internal memory device, such as an SRAM. Because the data of the current macroblock and the search area data are used repetitively in motion estimation of the current macroblock, the motion estimation device includes an internal memory device such as a synchronous random excess memory (SRAM) to read data required from the external memory device and stores the read data in the internal memory device for the use in motion estimation.

In motion estimation, there is in fact a large overlap between the search area data of adjacent macroblocks. Thus, the motion estimation device reads only the search area data of the next macroblock required for motion estimation, not the overlapping search area data. The search area data read from the external memory device is stored in an internal memory device. The internal memory device is divided into several internal memories due to data transmission with limitations of the internal memory device and for the use of overlapping search area data. For example, when a macroblock has a size of 16×16 a search area has a size of 144×80, the data transmission bandwith of the internal memory device is for example 128 bits and the number of bits per pixle is 8 bits, then the 144×80 pixels of the search area are stored in 9 16×80 internal memories. When the search area data is stored in divided internal memories, the total number of gates of the internal memory device is increased due to an increase in overhead and thus, the area occupied by the internal memory device also increases. Moreover, as the number of divided internal line memories increases, the number of data ports increases and the number of combination logic units for a multiplexing data read from each internal line memory also increases.

Therefore, there is a need for an efficient internal memory included in a motion estimation device to store data from a reference frame.

In present systems, image data of this search area or windows is usually stored in a local buffer or on chip memory, the so-called line memory, to which rather extreme bandwith requirements are made.

Motion estimation and motion compensation—or shortly MEMC—are well known technologies to accomplish temporal conversions of incoming video signals to be displayed on a screen on a higher display frequency. With this can version so-called movie judders can occur. Especially to compensate these movie judders, MEMC is often used to perform an up-conversion from the standardized 24-Hz used for movie signals up to the display frequency of e.g. 50-Hz or 60-Hz.

FIG. 1 shows a schematic motion portrayal for movie sequences or frames in a motion picture, said movie sequences or frames having a standardized 24-Hz frame rate.

In particular, in FIG. 1 a motion trajectory of a moving object in original frames n−1, n, n+1, and n+2 of a moving picture is visualized, wherein original frames have a standardized 24-Hz frame rate, and wherein the moving object is presented in FIG. 1 as a circle object 111, 112, 113, 114 with regard of the corresponding frames. The motion trajectory of the moving object 111, 112, 113, 114 in frames n−1, n, n+1, n+2 is supposed to be a straight line.

In order to perform the up-conversion it is necessary to have access on minimum of two temporal different fields or frames which can be classified according to its occurrence in time as previous frame and current frame. Depending on the desirable quality and concerning the incoming data format, the access to further temporal frames of the motion picture can be required in order to accomplish a sufficient interpolation performance regarding video quality.

FIG. 2 shows a pull-down mode 2:3 for 60-Hz up-conversion of a 24-Hz movie signal or motion picture to a 60-Hz display signal. The 24-Hz movie signal or motion picture corresponds the movie signal or motion picture of FIG. 1.

When performing an up-conversion, artifacts like large area flicker and line flicker may occur. In case of fast moving objects a strong blurring effect can be induced. Thus, the quality of the displayed image is reduced considerably.

Such a situation is presented in FIG. 2. The moving object 111, 112, 113, 114 of FIG. 1 is shown as reference. As mentioned, the motion trajectory of the moving object 111, 112, 113, 114 is supposed to be a straight line. However, due to artifacts and due to blurring effect the motion of the moving object 211, 212, 213, 214, 215, 216, 217 is not smooth as desired and as predefined by the reference 111, 112, 113, 114.

In order to avoid artifacts and the blurring effect, up-conversion methods have been proposed capable of performing a motion estimation and compensation of moving objects in the consecutive frames of a motion picture such that the artifacts and the blurring effect are overcome or compensated, respectively. In particular, motion estimation and compensation provides for detecting the moving parts of the frames and interpolating missing frames according to estimated motion.

FIG. 3 shows a full motion compensated by up-conversion of a 24-Hz movie signal or motion picture of FIG. 1 to a 60-Hz display signal or motion picture.

In FIG. 3, due to motion estimation and motion compensation performed, the moving objects 211, 212, 213, 214, 215, 216, 217 provide the desired motion trajectory of FIG. 1 presented exemplary by the moving objects 111 and 113 of FIG. 1.

Commonly used algorithms compensate the motion in two directions, i.e. as well in the horizontal and the vertical direction. For that operation a memory access should be randomly possible, which requires for an application in hardware sufficient embedded chip memory within video processor for the different temporal incoming data streams. The size of this embedded chip memory strongly depends on the search range (search area) for the motion, as already outlined above, where the motion estimation can match similar video patterns in two temporal positions and derive the velocity of the motion in terms of pixels per frame or field.

However, this matching process does not always work perfectly, since methods to determine the quality of the measured vector are required. Therefore, for the internal storage of further temporal incoming video signals additional memory resources are required. This, however, increases the amount of embedded memory even further, which leads to a rather expensive implementation and thus to an increase of the chip size since for an integrated circuit it is the chip internal memory which significantly determines the chip area. Consequently, the chip is getting more expensive. Especially in the mainstream market segment such as for LCD-TVs these additional costs typically form a limiting factor for an implementation of a motion estimation and motion compensation method.

The present invention is, therefore, based on the object to provide a more efficient motion estimation and motion compensation, in particular a vertical motion estimation and vertical motion compensation, by which also a more efficient use of the chip-internal resources and especially of the chip-internal memory with regard to motion estimation and motion compensation can be enabled.

SUMMARY OF THE INVENTION

One basic idea of the present invention is based on a methodology providing a line based vertical motion estimation and vertical motion compensation in consecutive frames of a motion picture, wherein the picture is divided in at least one region, the methodology comprising:

a first summing of luminance values for each line of the at least one region of a previous frame, wherein said first summing of luminance values results in a previous accumulation profile;

a second summing of luminance values of for each line of the at least one region of a current frame, wherein said second summing of luminance values results in a current accumulation profile; and deriving a vertical motion vector by use of the previous accumulation profile and of the current accumulation profile.

Luminance is a photometric measure of the density of luminous intensity in a given direction. It describes the amount of light that passes through or is emitted from a particular area, and falls within a given solid angle. Thus, luminance is the photometric measure of the brightness in a frame of a motion picture. If luminance is high, the picture is bright and if it is low the picture is dark. Thus, luminance is the black and white part of the picture.

According to the methodology presented, it is assumed, that the luminance of vertically moving parts or objects in a moving picture will move up or down the lines of the consecutive arranged frames of a motion picture. The summing or summation of luminance values for each line of the at least one region of a frame of the moving picture allows an effective and meaningful determination of an accumulation profile of luminance values of the corresponding region of the corresponding frame.

Thus, because of an effective preprocessing of the corresponding data of the consecutive frames (a previous frame and a current frame) also deriving of the vertical motion vector can be performed in an efficient way with regards to both the required memory capacity and runtime. The construction and the presentation of an accumulation profile according to the basic idea of the present invention inherits both an approach, which can be performed in a simple way, and an effective representation.

Further, such a methodology allows an implementation of vertical motion estimation and compensation, which does not need large amounts of additional memory capacity to analyze data of consecutive frames being the case in the most methodologies of the prior art.

Additionally, also a region wise treatment of frames becomes possible according to the present invention, as the picture can be divided in at least one region. In case of one region the region will correspond to the whole picture. Thus, a flexible implementation is allowed. On one hand, it becomes possible to divide the picture in desired order and number of regions being appropriate for a motion picture. On the other hand, it is becomes possible to analyse only such regions with regard to vertical motion, in which this motion is indeed expected or assumed, being a further factor of possible increase of efficiency according to the basic idea of the present invention.

According to an embodiment of the present invention, data of the previous frame can be derived from a first line memory and data of the current frame is derived from a second line memory. Further, the first line memory and/or the current line memory can be used also in other applications like a deinterlacer application or a temporal noise reduction application.

Thus, additionally a efficient storage equipment like line memories is used according to the present invention. Furthermore, a more general efficiency of implementation of the present invention is provided by the fact, that no extra memory means or arrangement for motion estimation and compensation only is required. On the contrary, the use of additional storage equipment is avoided, as the storage of data is organized such, that also other applications may profit from the storage, the line memories, and may be performed by use of the frame data stored in the corresponding line memories.

According to an embodiment of the present invention, the deriving a vertical motion vector comprises:

selecting summed luminance values of a number of lines of the at least one region of a current frame around a central line of the at least one region of a current frame in the current accumulation profile as a subprofile of the current accumulation profile;

matching the subprofile of the current accumulation profile in the previous accumulation profile.

Thus, the present invention allows a variable performance of maching of accumulation profiles, where beside a comparison of the whole profile also (shift like) maching of sub-parts of the accumulation profiles is enabled. The later way represents a kind of fine grined maching increasing accuracy of the maching process and thus of the derived vertical motion vector.

Additionally, a set of vector candidates derived from the previous accumulation profile can be used in the matching. Thus, the efficiency of performance can be increased, as only a set of vector candidates has to be checked.

Further, one basic idea of the present invention is based on an apparatus for providing line based vertical motion estimation and vertical motion compensation in consecutive frames of a motion picture, wherein the apparatus is configured to perform the method sketched above and described in more detail bellow.

The apparatus may comprise a first line memory for storing data of the previous frame and a second line memory for storing data of the current frame. As regards the line memories, the first line memory and/or the current line memory may be configured to be used in at least one of the following: a deinterlacer application and a temporal noise reduction application Further, one basic idea of the present invention is based on a computer program product comprising a code, said code being configured to implement the method sketched above and described in detail bellow. The computer program product can be comprised in a data carrier.

Additionally, one basic idea of the present invention is based on a data carrier comprising a computer program product sketched above.

Thus, one basic idea of the present invention is based on the conclusion that for the main stream market segment the performance and therefore the search range can be limited to the occurrence of the most likely horizontal motion in natural captured scenes. This offers the possibility to reduce the chip embedded memory to one single line memory for the previous and one single line memory for the current motion portrayal or motion picture as search range.

The present invention further describes also a method for motion estimation and motion compensation which operates only in the horizontal direction and therefore performs the motion estimation and motion compensation operations using a single line buffer memory, the so-called line memory.

In video signal processing line memories are often used in other applications which already have access to the previous and current motion frames of a motion portrayal or motion picture e.g. like so-called de-interlacer applications or temporal noise reduction applications. According to the present invention the used line memories used in these applications are now additionally used also for motion estimation and motion compensation operations. By using these existing line memories no further memory bandwidth has to be added to the memory bus. Thus, this solution offers the possibility to accomplish the motion estimation and motion compensation operations by adding a minimal or in the optimal case no additional memory to the existing video processing system.

As already mentioned above, the method according to the present invention for motion estimation and motion compensation operates on line memories of the previous and current field or frame. This advantageously enables silicon area reducing and cost saving implementations.

In general, applications are possible, in which the compensation performance is limited to motion in one direction and especially to the horizontal direction only, since most of the motion in natural scenes has this tendency. By using existing line memories of the video signal processing system, the memory bandwidth is kept uninfluenced.

However, within this scope, situations may arise, when the method dealing with motion estimation and compensation in horizontal direction only can not compensate vertical motions. In these situations, the vertical motion estimation and compensation as sketched above and described in more detail bellow provides an effective extension, which does not need large additional memory arrangements and performance of which is a very runtime saving task.

Thus, the vertical motion estimation and compensation as sketched above and described in more detail bellow by examples can be performed independently of horizontal motion estimation and compensation and also in combination with the horizontal motion estimation and compensation, wherein the combination can be performed in dependence on a certain situation or the motions present, respectively.

Thus, the visibility of artifacts can be reduced in an effective, fast and storage saving way.

Advantages, embodiments and further developments of the present invention can be found in the further subclaims and in the following description, referring to the drawings.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figs. of the drawings, in which.

In all figures of the drawings elements, features and signals which are the same or at least have the same functionality have been provided with the same reference symbols, descriptions and abbreviations unless explicitly stated otherwise.

DETAILED DESCRIPTION OF EMBODIMENTS OF THE PRESENT INVENTION

In the following description of the present invention first of all a short overview of motion estimation and motion compensation is presented at first by example of horizontal motion estimation and compensation. However, motion estimation and compensation described by example of horizontal processing case is correspondingly applicable also to the vertical motion estimation and compensation, as the accumulation profiles also represent a kind of lines.

The MEMC method consists mainly of two sections, the motion estimation (ME) and the motion compensation method (MC). The motion estimation performs the measurement of the Motion and derives the velocity of the displayed regions in pixel per picture (field or frame). Also the direction of the motion will be indicated by a positive or negative sign. These measured motion information can be described as a motion vector. The motion vector will be used for the motion compensation to interpolate the picture at the temporal accurate position and to avoid, so-called judder effects and or so-called motion blurring effects.

Figure 1:
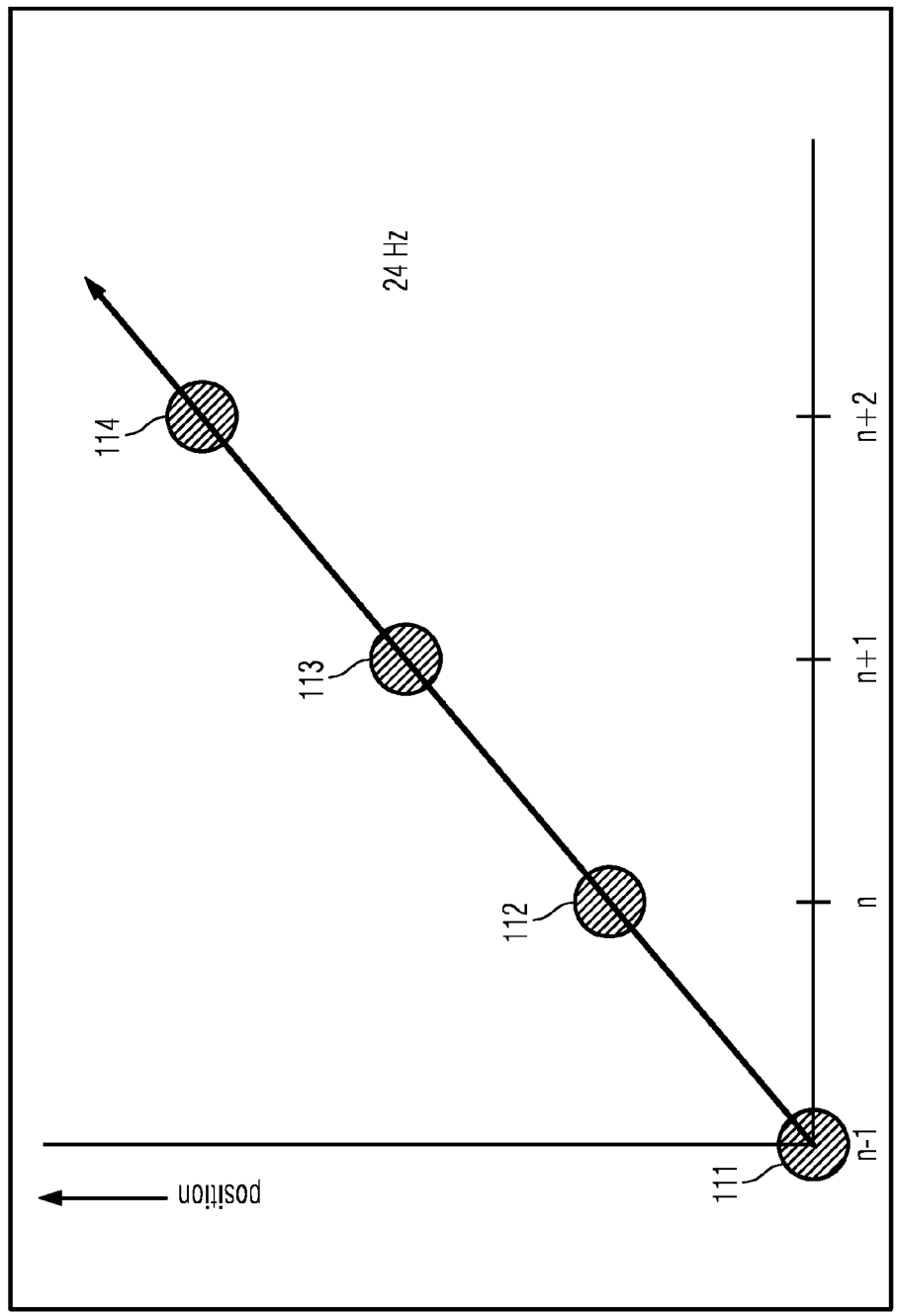
FIG. 1 shows a schematic motion portrayal for Movie sequence in standardized 24-Hz frame rate.
Figure 2:
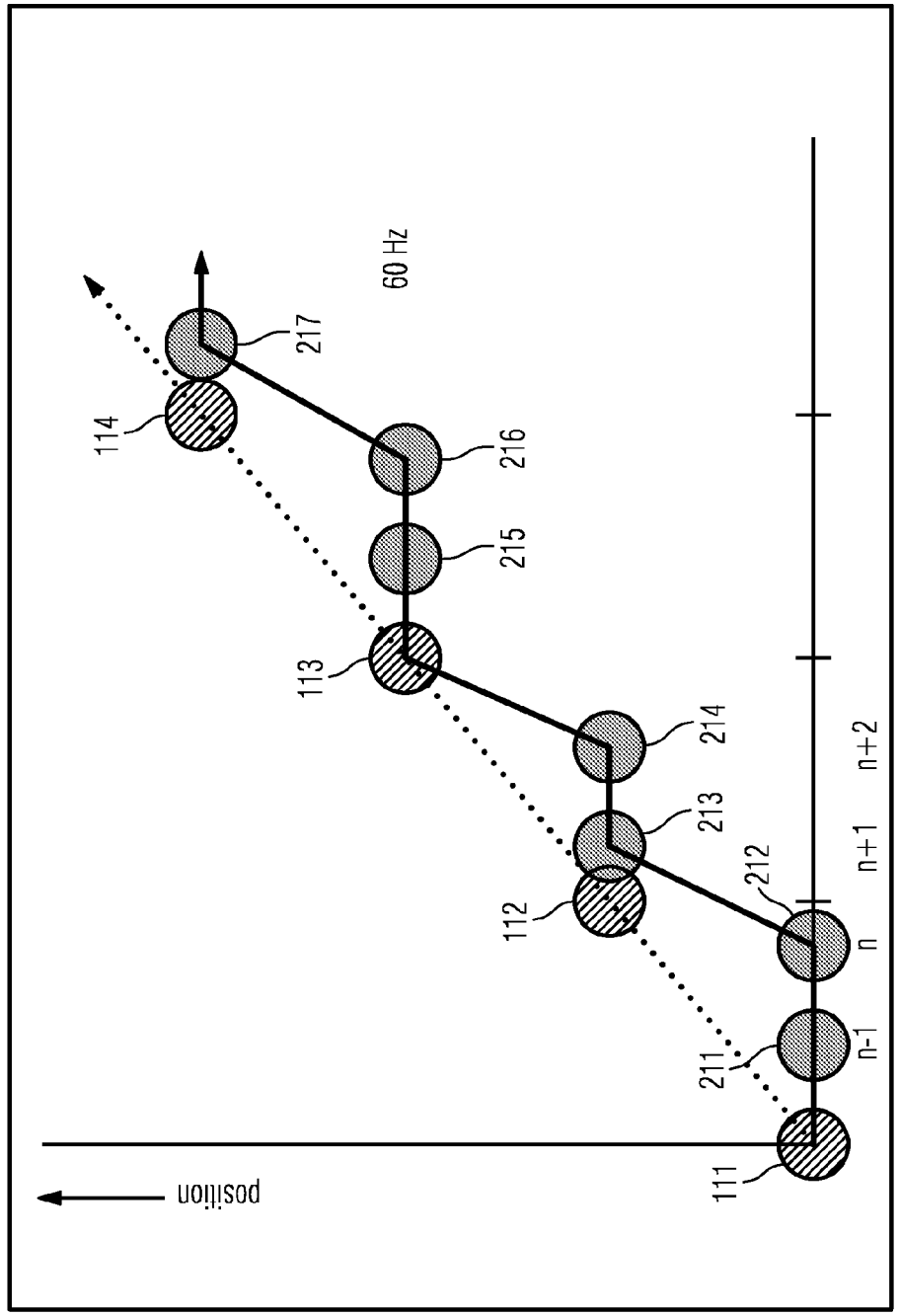
FIG. 2 shows a pull Down Mode 2:3 for 60-Hz up-conversion.
Figure 3:
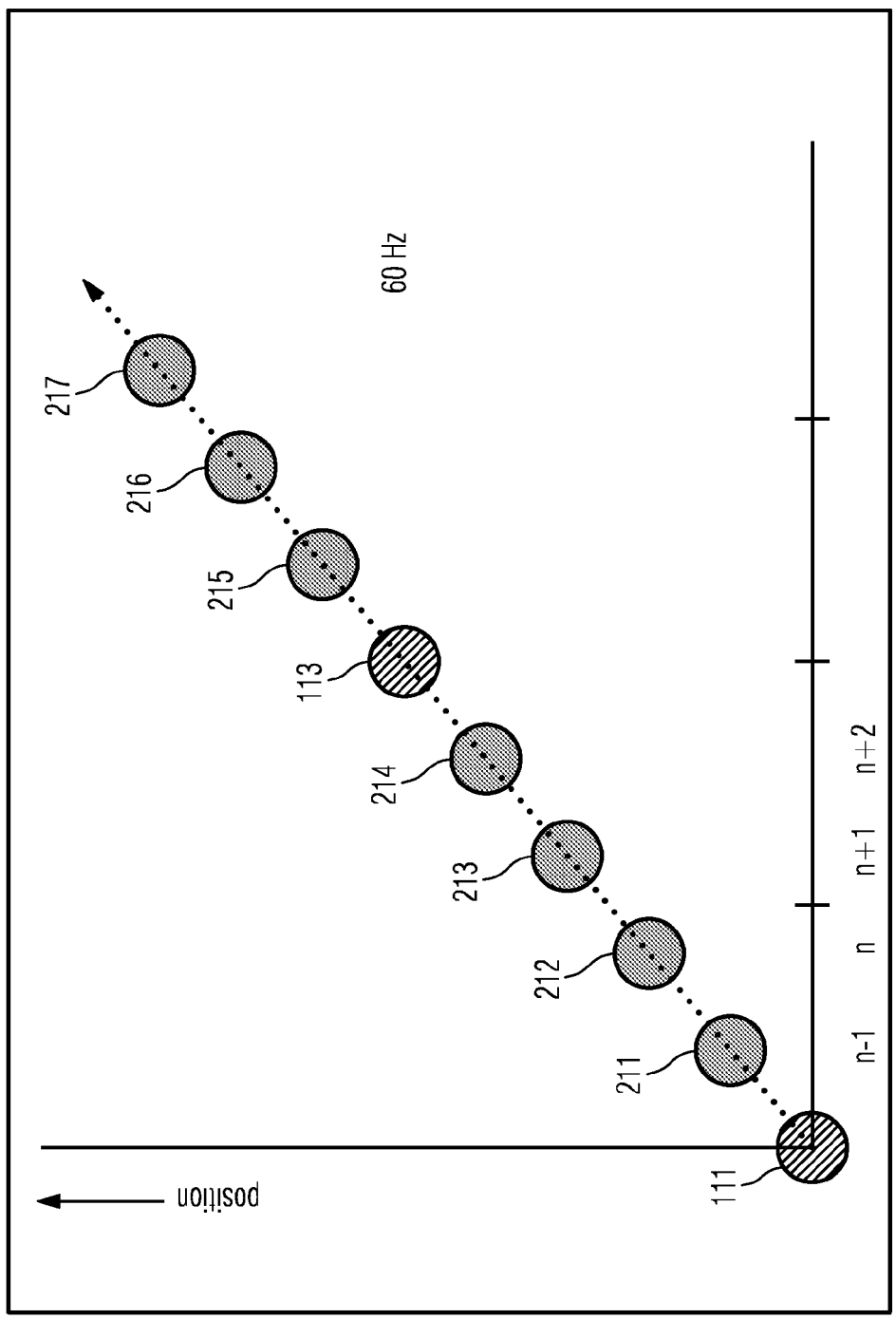
FIG. 3 shows a full Motion compensated up conversion of 24-Hz Movie source to 60-Hz Display frequency.
Figure 4:
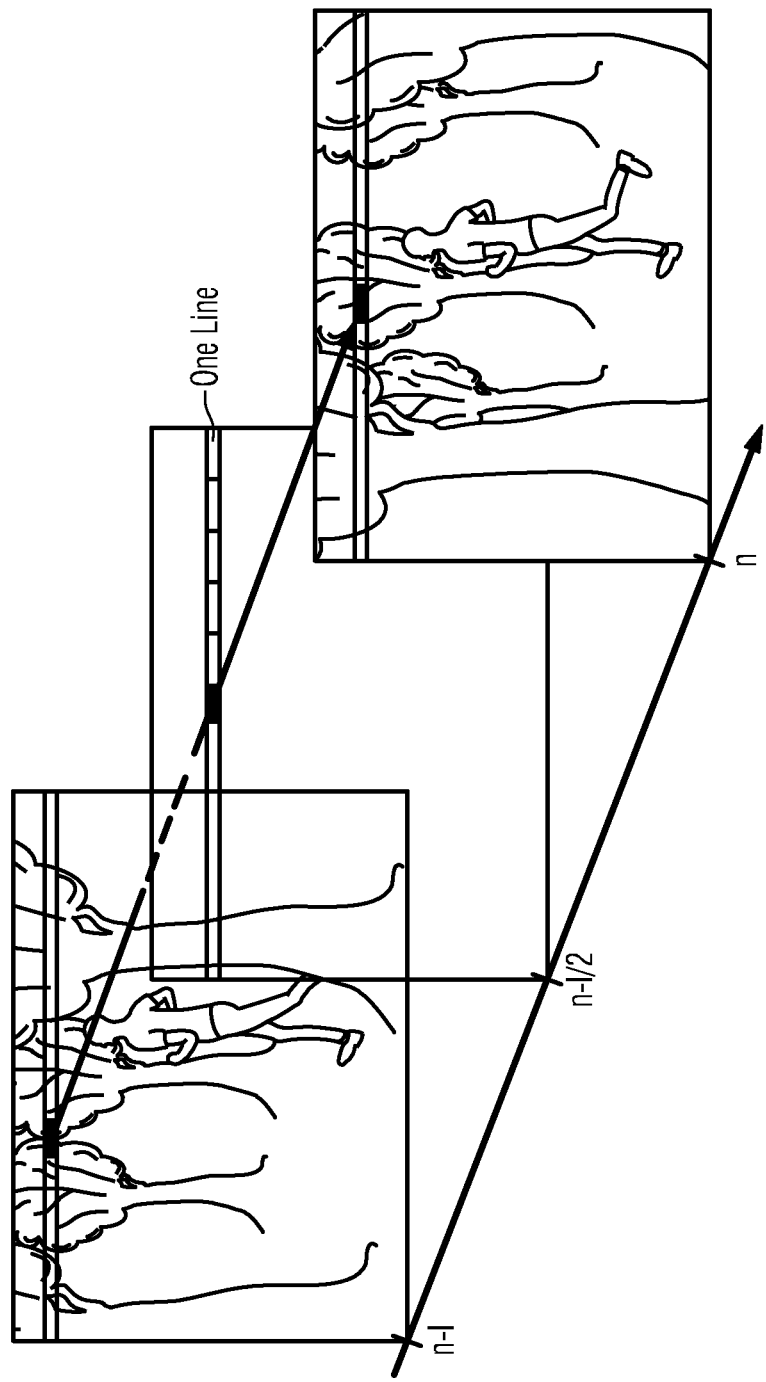
FIG. 4 shows the Motion Estimation principle for the line-based Motion Estimation.
Figure 5:
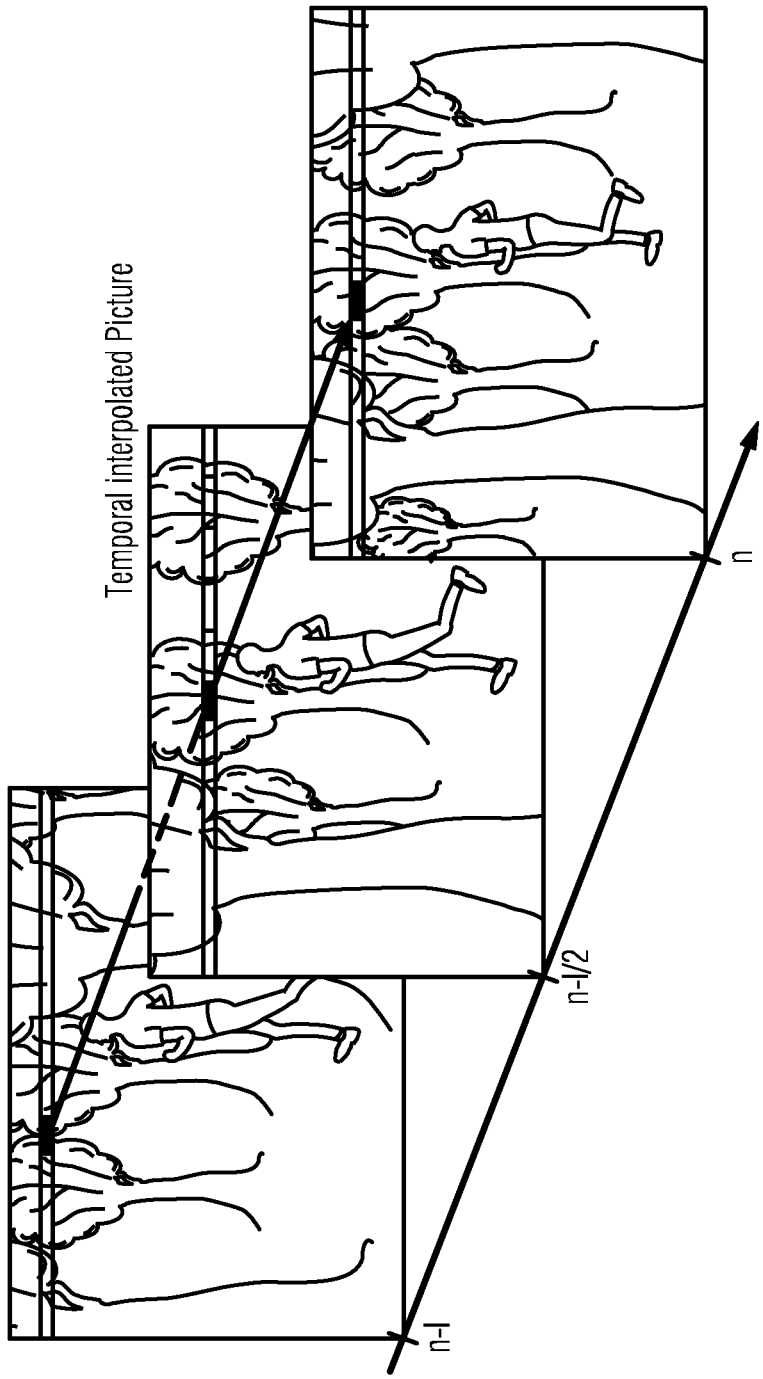
FIG. 5 shows the Motion Compensation principle of the line-based Motion Compensation.

FIGS. 4 and 5 shows the motion estimation principle for the line based Motion Estimation by means of a current and a previous frame of a motion picture. According to the temporal position the vector will be split by its length into two parts, where the one part points into the previous frame (n−1) and the other part points into the current frame (n).

For interpolation of the frame (n−½) between the current and the previous frame, pixels from both temporal frames are taken into account for the compensation.

Figure 6:
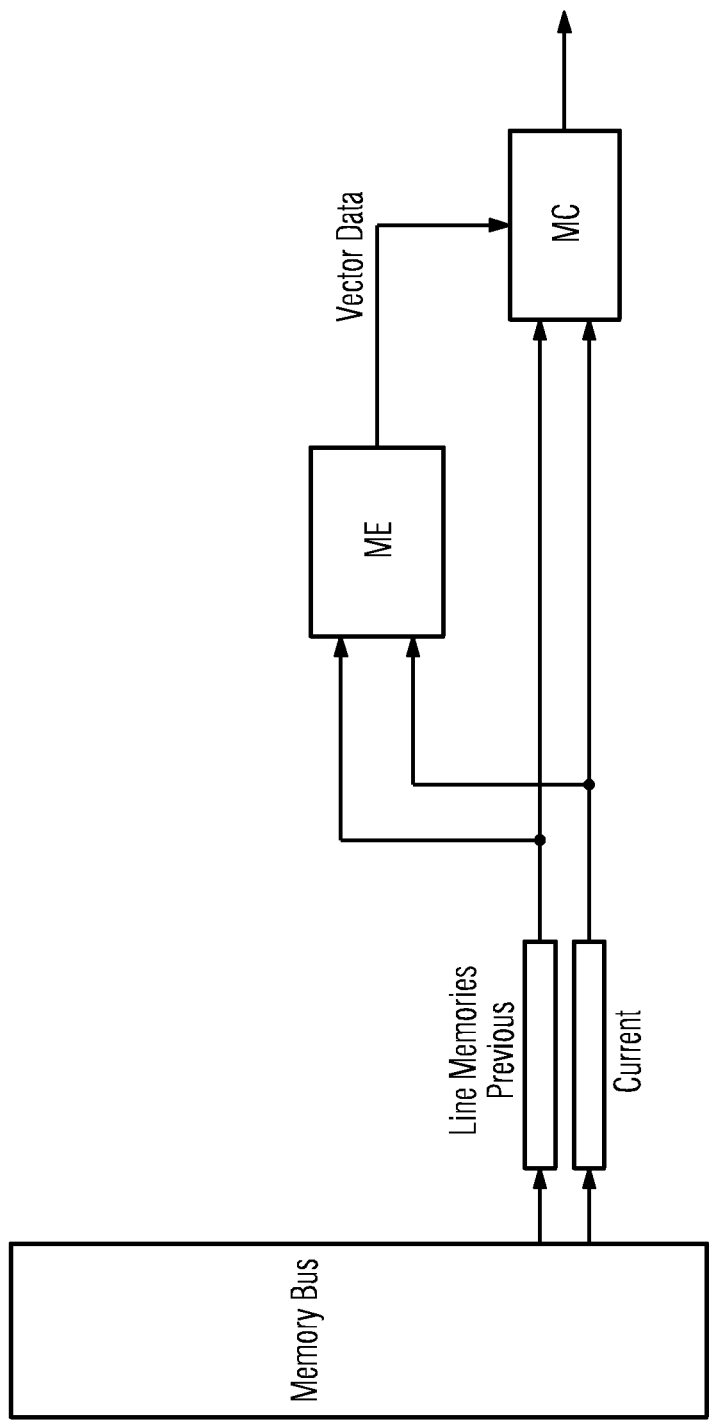
FIG. 6 shows a block diagram of line-based Motion Estimation and Motion Compensation.

FIG. 6 shows a block diagram of a line-based motion estimation and motion compensation. FIG. 6 shows also a system for motion estimation and motion compensation. The system comprises a memory bus, two line memories, a motion estimation device ME and a motion compensation device MC. The memory bus typically is an external bus which is connected with an external memory device such as a SDRAM. Image data to be displayed in a pannel such as an LEC-pannel is stored in this external memory. Via the memory bus this data can be transferred to the line memories. In the present implementation only two line memories are needed whereas the first line memory is used for data of the previous frame and the other or second line memory is used for data of the current frame. These two line memories are both coupled to the motion estimation device ME and motion compensation device MC. The motion estimation device ME generating out of the data, stored in these line memories, a vector data, which is transferred additionally to the motion compensation device MC. The motion compensation device MC performs a motion compensation using the data within the line memories and the vector data. At the output, the motion compensation device MC provides a video signal which drives an LEC-pannel for displaying the motion compensated video signals.

Hereinafter the operation of the motion estimation device ME or motion estimation methodology is described in more detail.

For the motion estimation a selection of e.g. 9 pixels around the center pixel, for which the motion shall be determined, are taken from a line memory of the current frame. In principle the luminance profile of these 9 pixels is compared with the luminance profile of the previous line memory. In order to derive the true motion the luminance profile will be shifted over the search range of the horizontal motion (a typical value for the search range can be 64 (+31 . . . −32)

Figure 7:
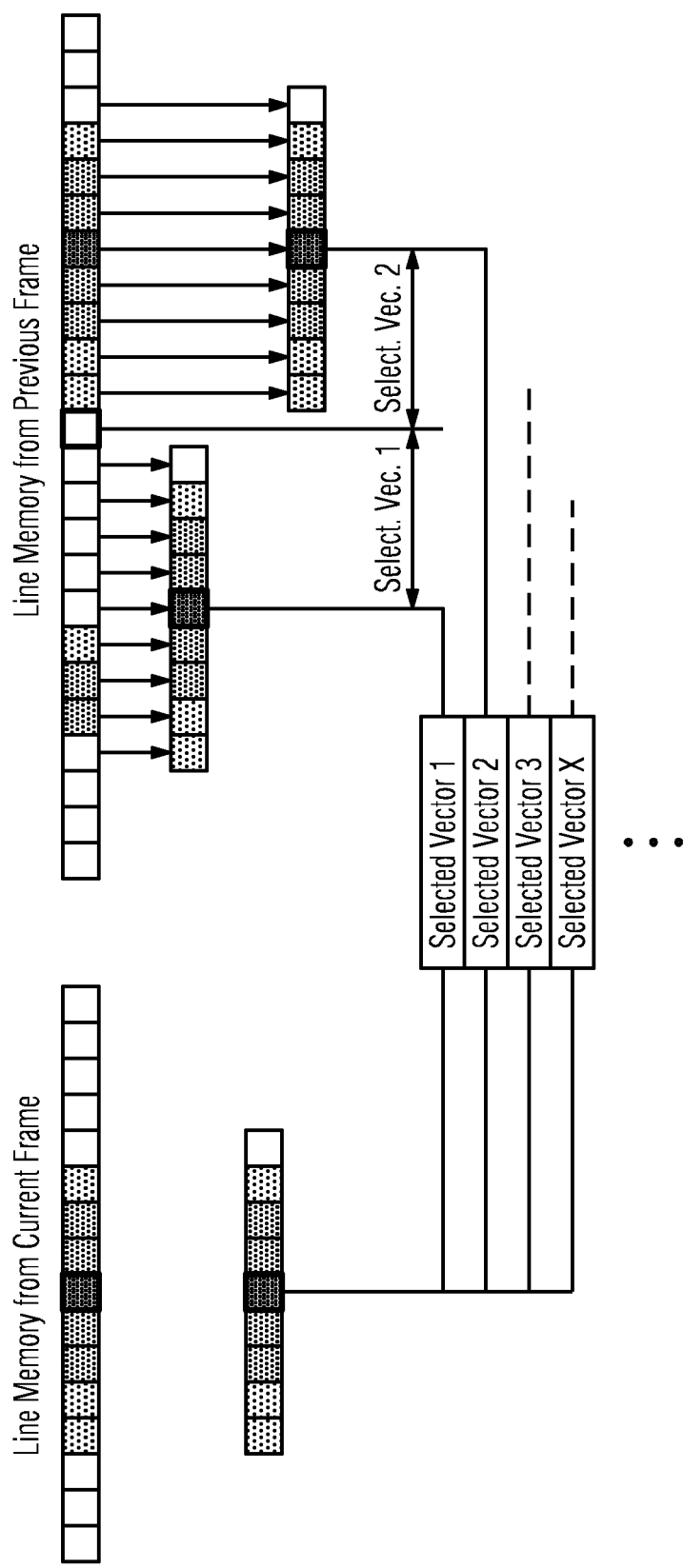
FIG. 7 shows a matching process of the Motion Estimation.

Using Selected Vector Samples for Motion Estimation:

FIG. 7 shows the matching process of the motion estimation.

Assuming the motion of the objects in the scene will be constant from frame to frame and the objects are larger than a group of pixels (e.g. 9 pixels), the matching process can be then performed more efficiently if only a set of selected vectors are checked for a matching luminance profile. For example, one selected vector can be taken from the neighboring pixel. A second selected vector can be taken from the previous line, if the already estimated motion vectors are stored in a vector memory. The zero-vector is also a good sample vector in order to detect regions with no motion more efficiently. In principle number of selected vectors, which will be taken into account, depend on what kind of vector quality is desired to be accomplished.

Variation of the Selected Vectors:

In order to set up the process of motion estimation and to follow the deviation from the constant motion, a variation of certain, for test operation selected vectors is required. That means that for selected vector samples a certain amount of motion will be added or subtracted. That can be done by a variance with different amount of motion speed. The tested implementation checks between odd pixels and even pixels alternating an update of +/−1 pixel and +/−4 pixel on the previously determined motion vector. The selection of the variance is adjustable and variable as required or as the need arises and depends e.g. on the resolution of the incoming video signal.

For the line-based motion estimation it is very important that the vector will converge quickly for the real motion in the scene. Therefore the selection of the tested vectors is treated differently for the first line. In the first line of each field the selected vectors which normally test the vectors of the line above are loaded with vector values, which vary according to a triangle function from pixel to pixel. The triangle function oscillates from an adjustable minimum value and a maximum value. For that purpose also other functions e.g. like saw tooth or sinusoidal functions can be used for the determination of the first line.

Figure 8:
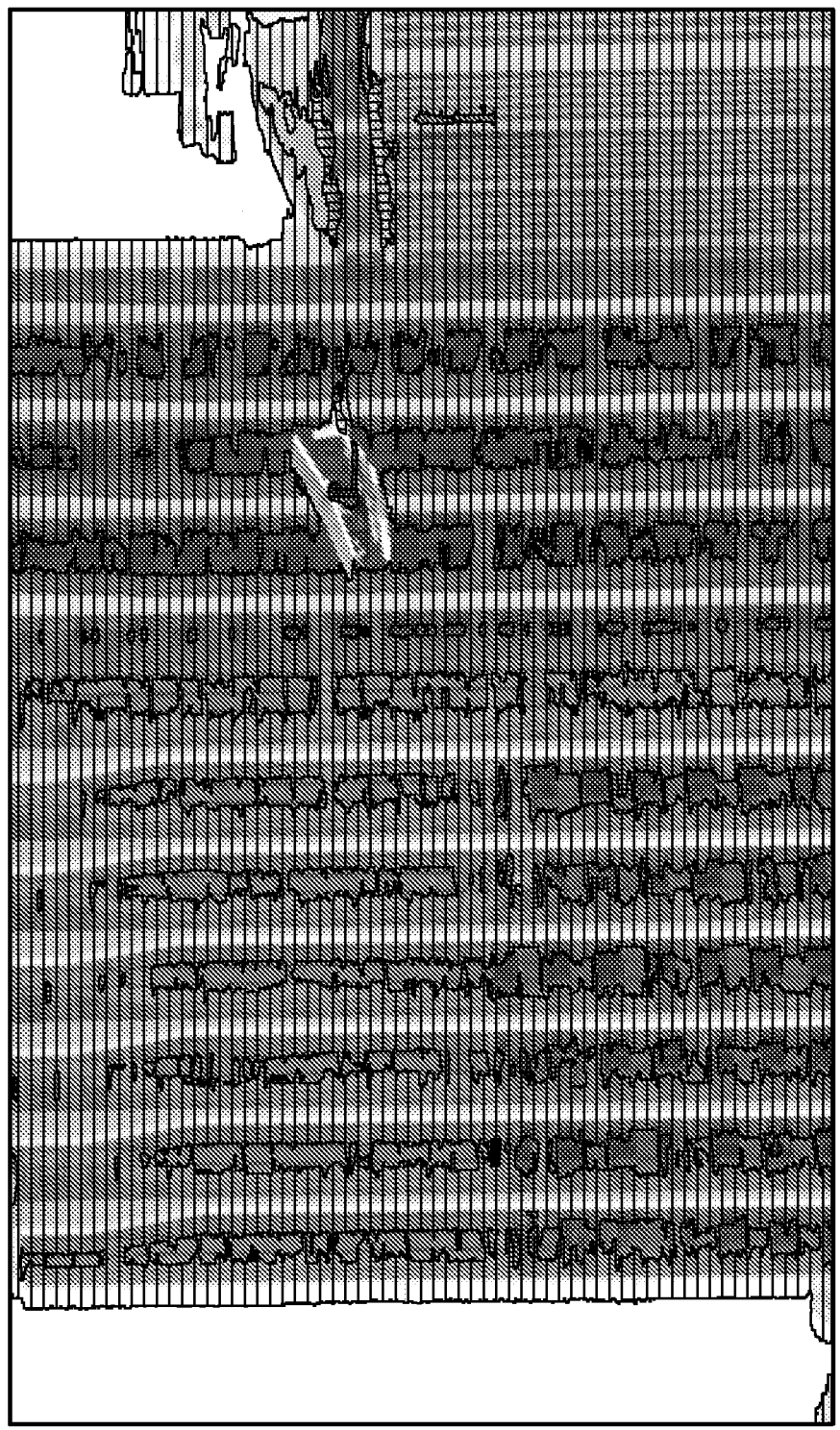
FIG. 8 shows a motion vector color overlay, whereas horizontal hatched areas indicate a motion to the right and vertical hatched areas indicate a motion to the left.

The Matching Process:

FIG. 8 shows a motion vector color overlay. Here, horizontally hatched areas indicate a motion to the right and vertically hatched areas a motion to the left. The following matching process advises a failure value to each tested vector. This failure value can be also a quality value. For example, sum of absolute difference (SAD) can be used. The vector corresponding to the lowest (SAD) failure value will be selected as the most probably vector representing the motion in the local scene.

Attenuation of the Vector Selection, Vector Damping:

In order to control the vectors with equal (SAD) failure values and to give the vector selection process a certain direction, advantageously a damping value is used which depends on the vector attenuate the vector field.

Vector Memory:

The motion vector itself can be stored in a vector memory device for further processing and for the motion estimation of the next pixel. The motion estimation process is a recursive process. The size of this vector memory depends also on the quality level which will be desired to achieve with the interpolation algorithm. The tested implementation has just one line of vector memory, where every second vector will be stored alternatingly, in order that an access of the vectors from the measured line above is possible.

Figure 9:
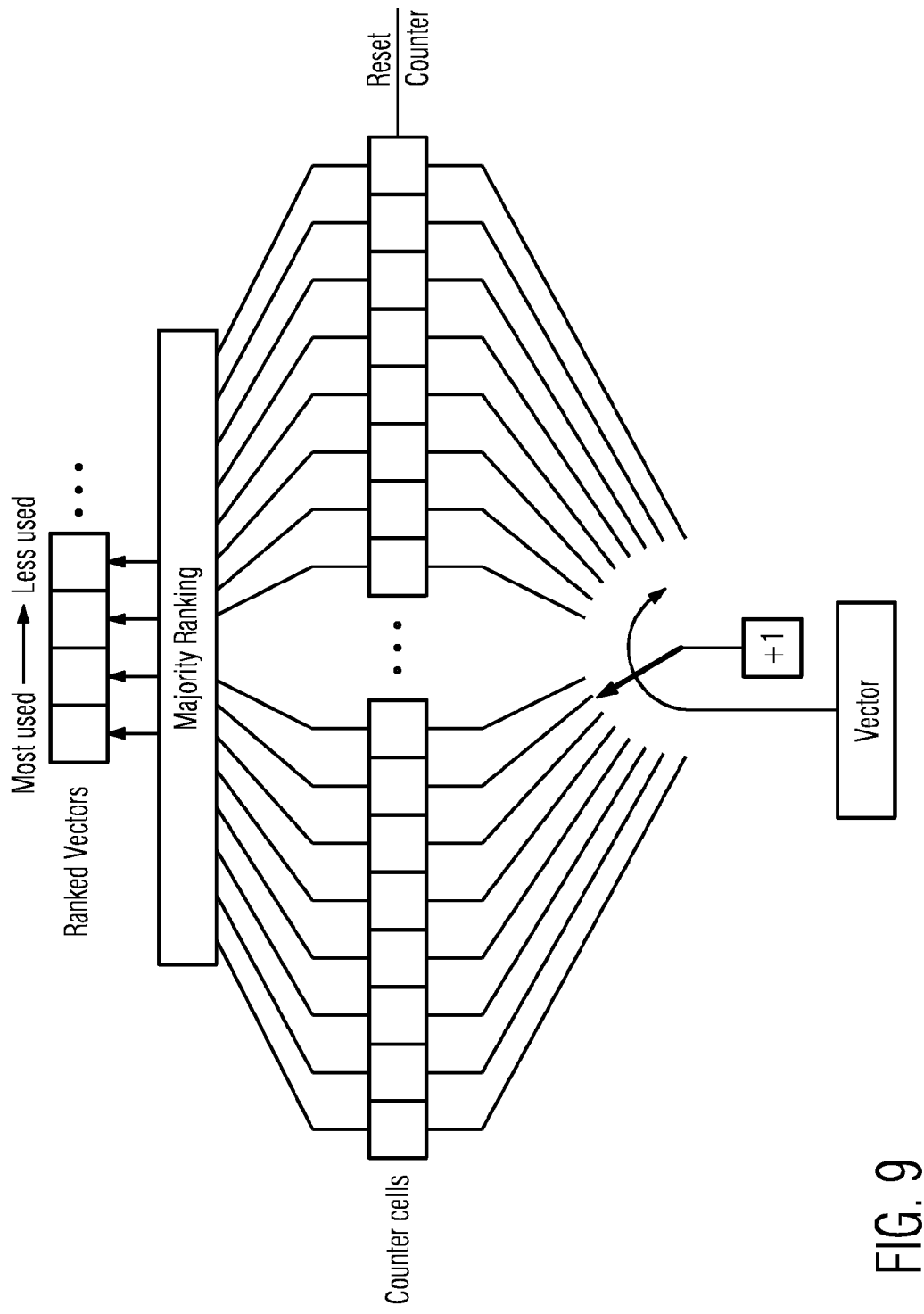
FIG. 9 shows a function principle of the vector histogram and vector majority ranking to derive most and less used vectors in the actual scene.

Robustness Improvement by Providing Vector Histogram:

FIG. 9 shows the basic principle of the vector histogram and vector majority ranking to derive most and less used vector in the actual scene. In order to make the vector field more reliable and more homogeneous, additionally a vector histogram is calculated. Therefore, the amount of the occurrence of each vector will be counted. A simple ranking selects the most often used vector and applies this vector for the estimation determination. This can be done either for the whole frame or for only parts of the frame. It is very efficient to split the picture into horizontal stripes and return a most often used vector for each stripe. News ticker can be detected advantageously in that way very reliable.

Figure 10:
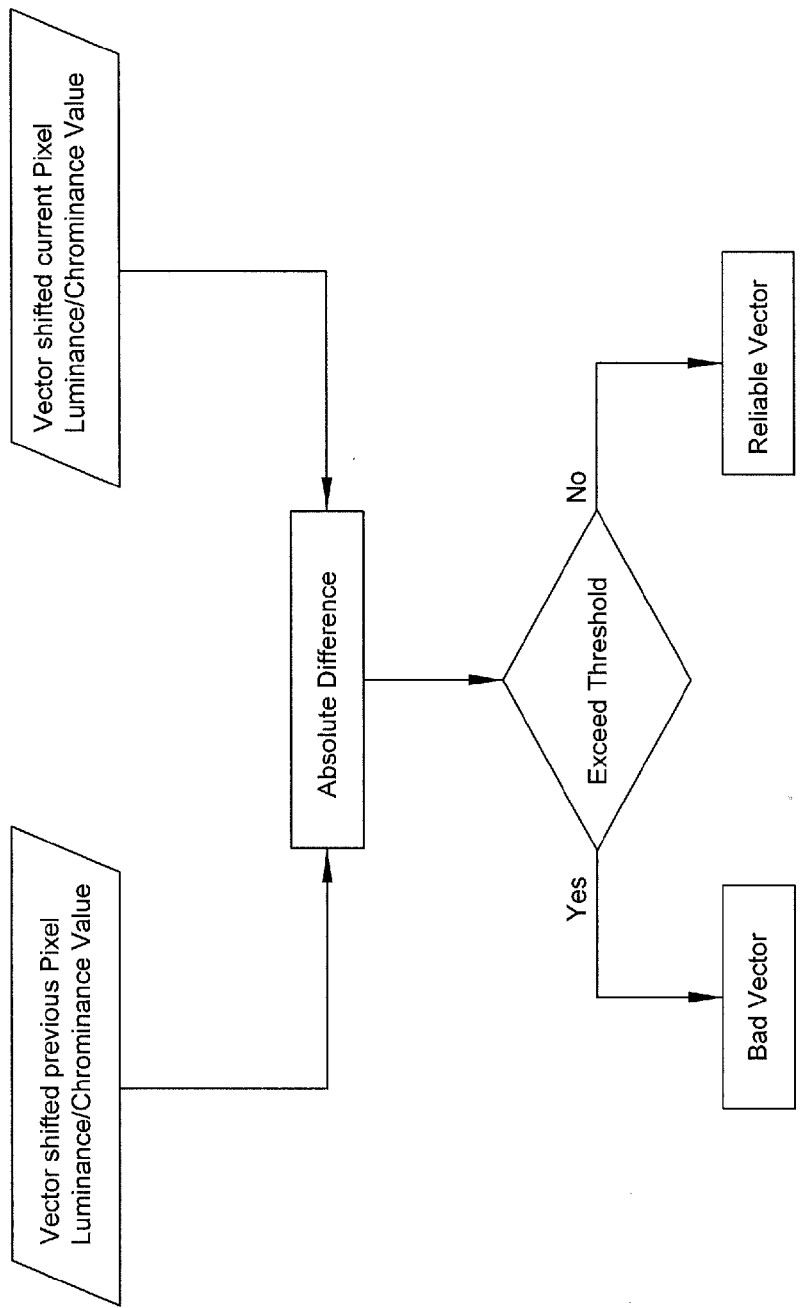
FIG. 10 shows a flow diagram of unreliable vector detection
Figure 11:
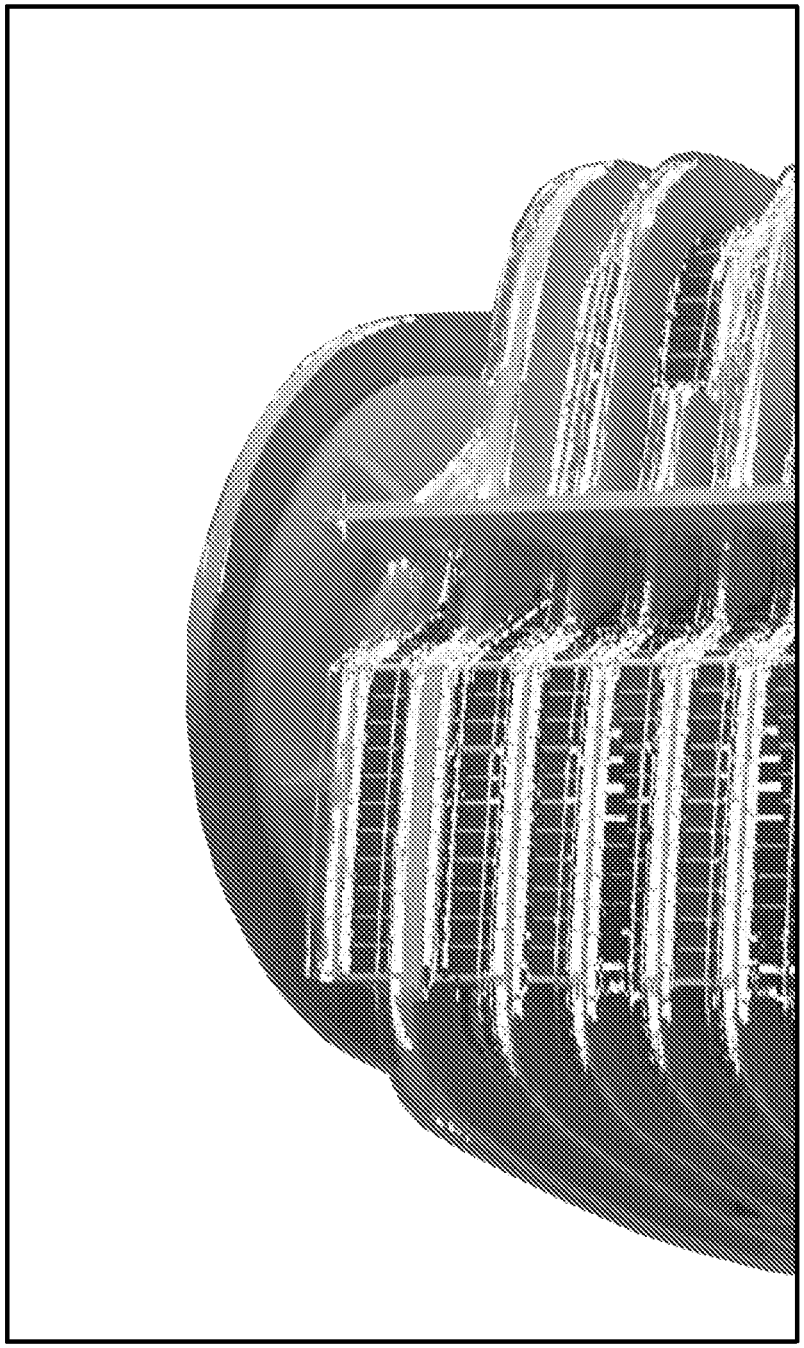
FIG. 11 shows unreliable vectors detected and marked (in white) in the tower sequence with strong vertical motion.

Unreliable Vector Detection:

FIG. 10 shows a flow diagram for the detection of unreliable vectors. FIG. 11 shows unreliable vectors detected and marked (in white) in the tower sequence with strong vertical motion. Under certain circumstances, the horizontal motion estimation will not deliver reliable motion vectors. Especially vertical movements as well as occlusions and uncovering areas can not been matched reliable by providing an access of the current and previous line. Not reliable vectors lead to relatively large, undesired differences for the compensation process. That means, that the luminance pixel value of the vector compensated previous frame/field strongly deviates from the vector compensated luminance pixel value of the current frame/field. If this difference exceeds an adjustable value the vector will be selected as a bad vector. Otherwise, it is assumed that this vector is a reliable vector. The bad vector will be marked and the MSB-bit of the vector memory will be set to one. The MSB-bit then indicates whether this vector can be used for further estimation processing or not.

Figure 12:
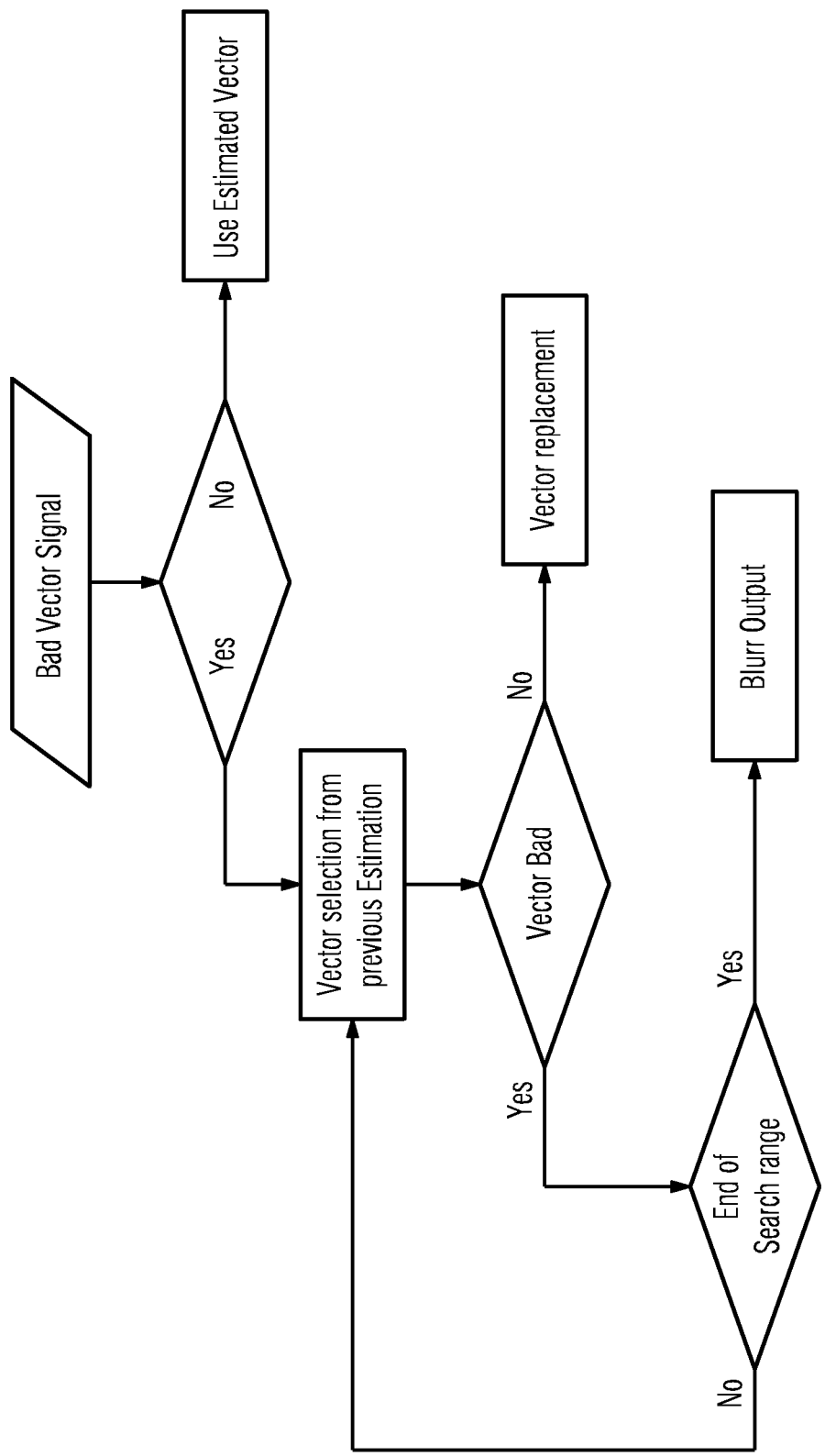
FIG. 12 shows a flow diagram of bad vector replacement and error concealment.

Bad Vector Replacement:

FIG. 12 shows a flow diagram of bad vector replacement and error concealment. Bad vectors are treated in a special way in order to cover and to avoid introducing artifacts. In case of the occurrence of a bad vector, a reliable vector will be searched from the stored vector memory from the line above. Therefore, only those vectors are used which are not marked as unreliable. The search process starts from the most outer border of the search range, in order to find a reliable vector of the surrounding area. After replacing the bad vector with a reliable vector, this reliable vector will then be used for the motion compensation process.

Figure 13:
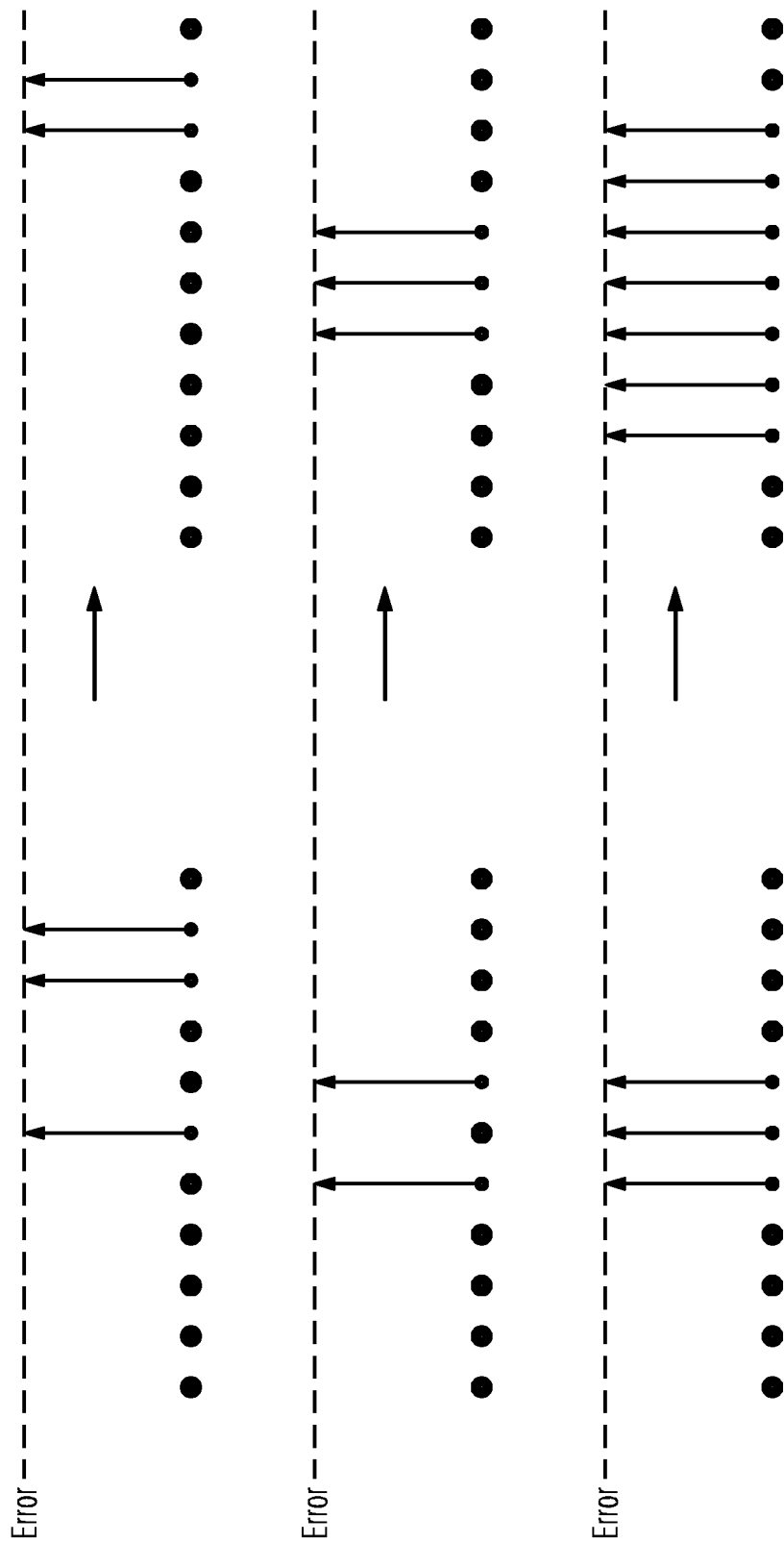
FIG. 13 shows a diagram for error spike suppression and error region extension.

Adaptive Error Region Extension and Error Spike Suppression:

The remaining unreliable vectors lead to artifacts in the interpolated picture. These artifacts can be covered by intentional blurring this region. In order to provide efficient artifact concealment the error regions are cleaned up from single spikes. FIG. 13 shows a diagram illustrating an error spike suppression and an error region extension method.

Single spikes will be suppressed. Double spikes separated by a single reliable vector will be combined as one region. After cleaning up in that way, the remaining error regions have to be extended by additional two pixels of bad vectors in front and after the bad error region. This operation ensures the proper behavior of the blurring filter. The blurring filter only operates horizontally.

Figure 14:
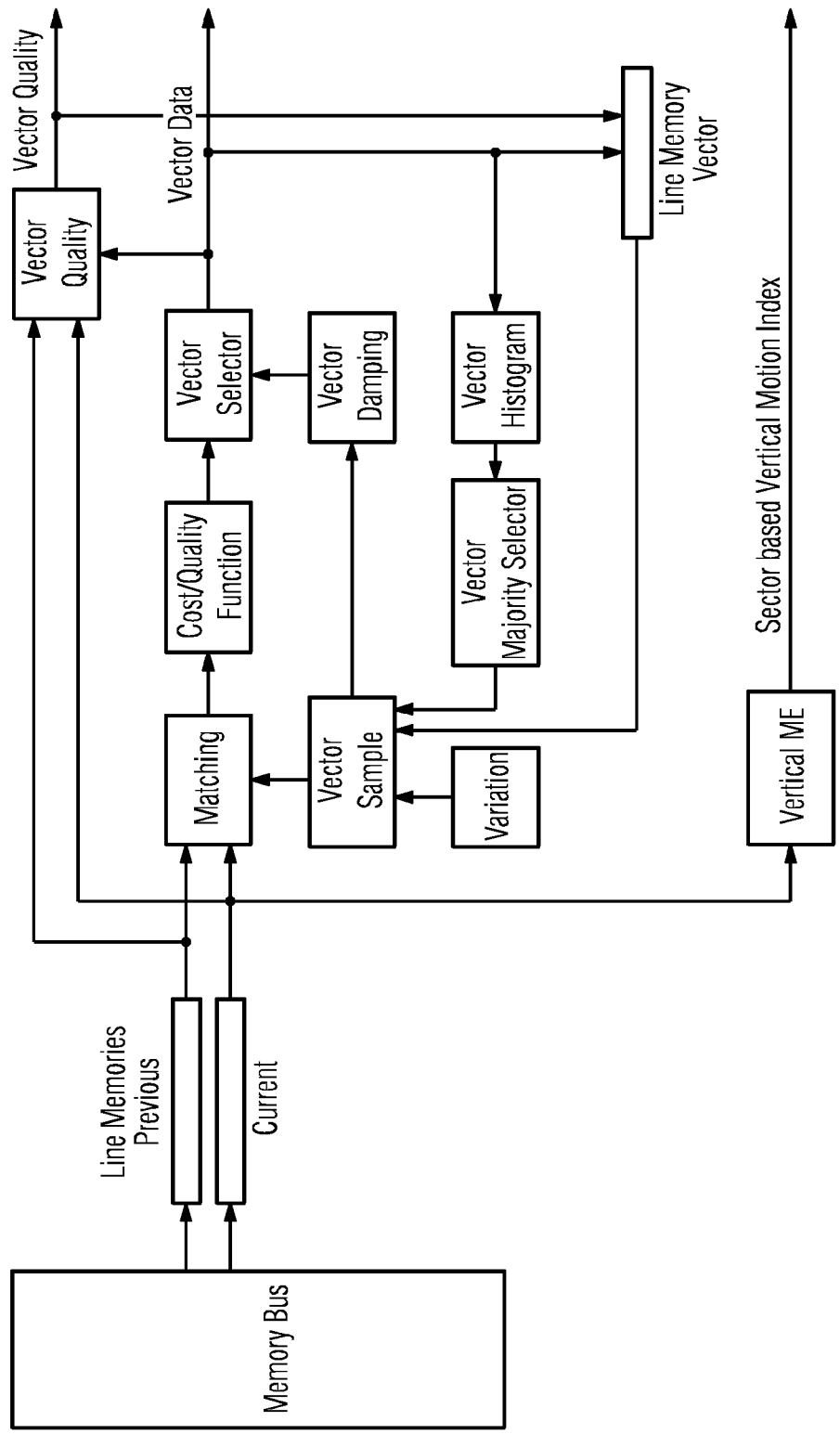
FIG. 14 shows a block diagram of the line-based mMotion estimation.

FIG. 14 shows a block diagram illustrating the line-based motion estimation as described above and as implemented in a motion estimation device ME as shown in FIG. 6. Here, the provision of a vector histogram to provide a ranking of most and less used vectors in the actual scene as shown in FIG. 9 is implemented in the vector histogram device in FIG. 14.

Figure 15:
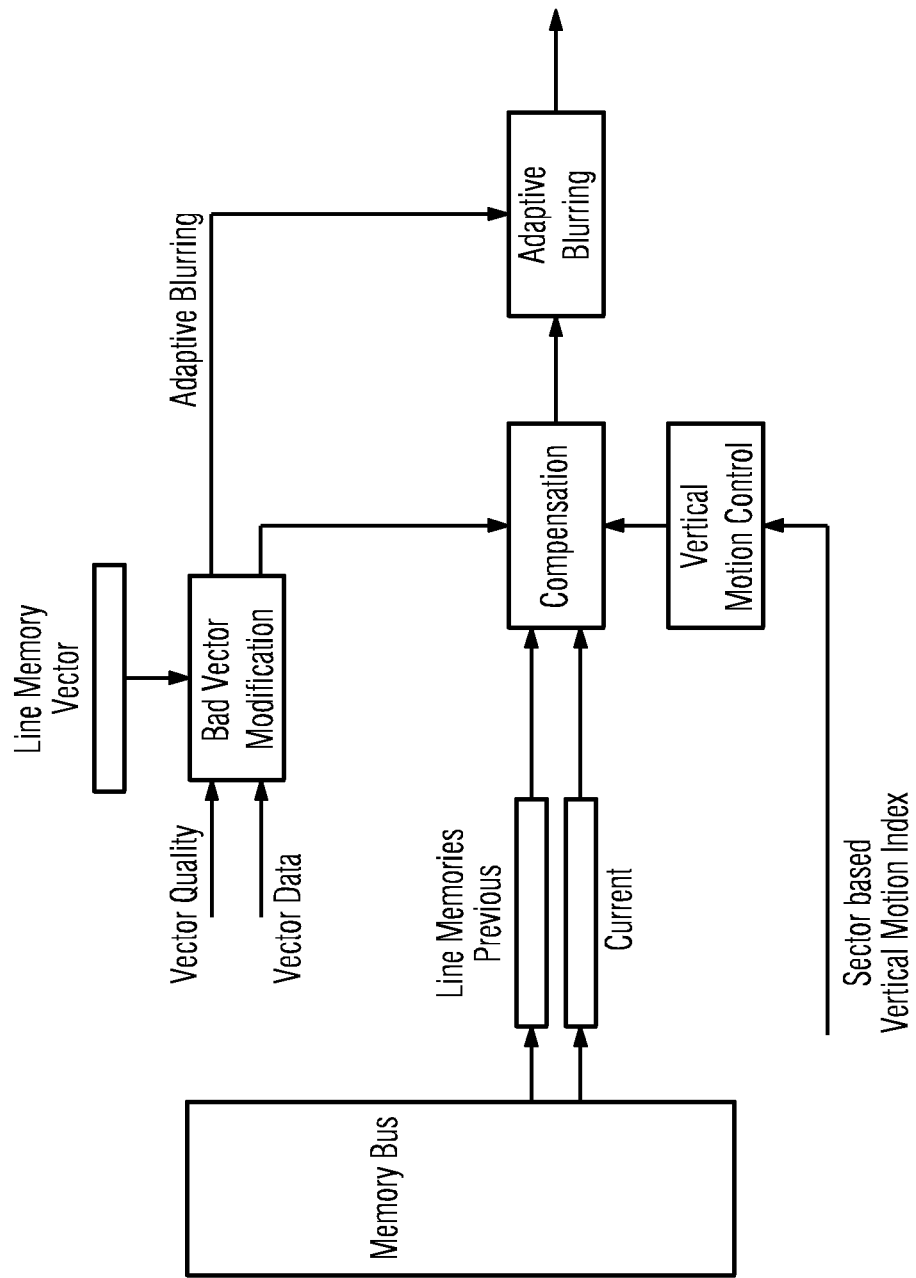
FIG. 15 shows a block diagram of the line-based Motion Compensation with adaptive artefact concealment.

Hereinafter the motion compensation process which is performed in the motion compensation device MC 65 of FIG. 6 is described with regard to FIG. 15 in more detail. FIG. 15 shows a block diagram of the line based motion compensation using adaptive artifact concealments.

The motion compensation performs the temporal interpolation according to the motion vectors estimated by the motion estimation device MC. Therefore, a Median Filter is used which uses as input data the luminance values of the vector compensated previous, the vector compensated current and the uncompensated previous. The chrominance can be compensated as well.

Depending on the vector quality a replacement vector indicated as reliable vector will be searched in the local area of the vector memory from the line above. If no reliable vector can be found the adaptive blurring typically tries to cover this artefact.

Figure 16:
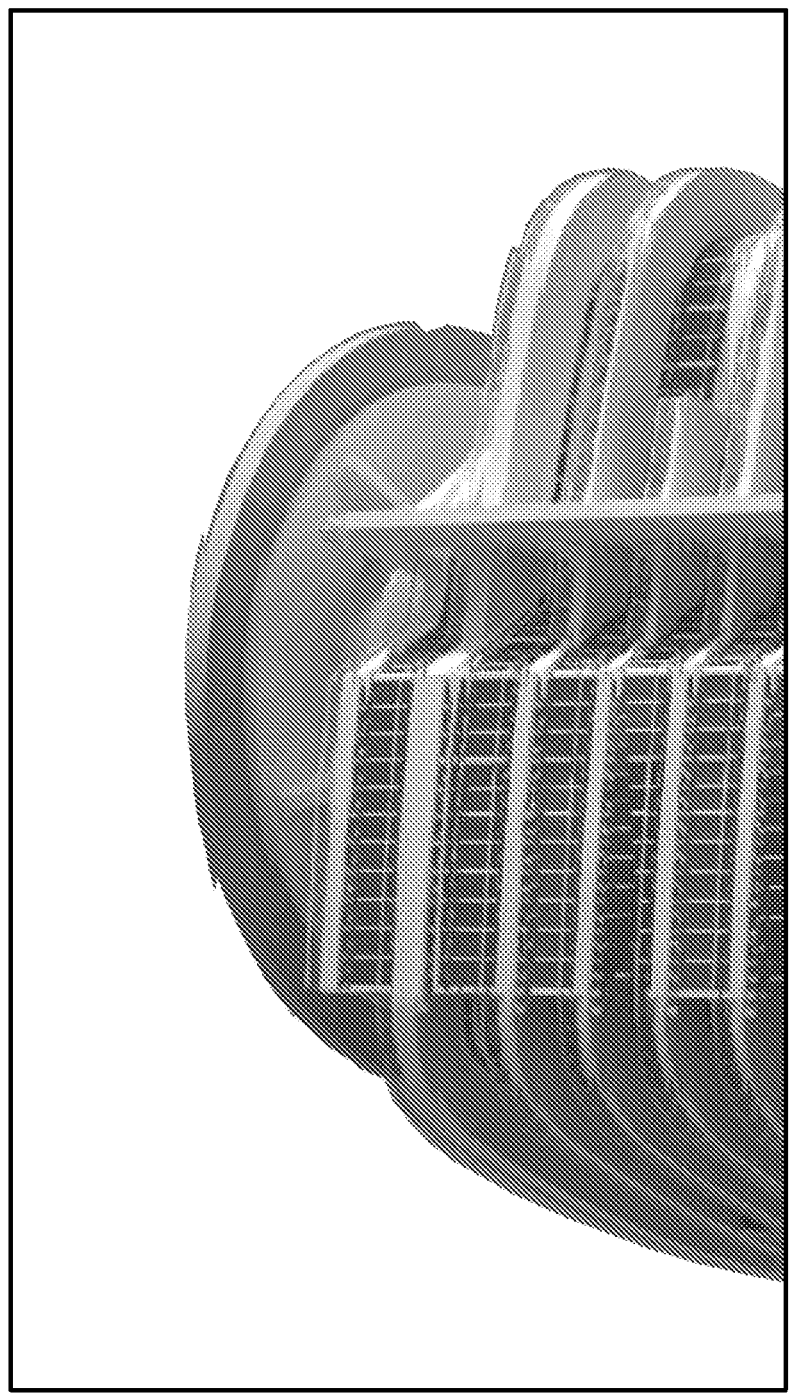
FIG. 16 shows a sequence of the vertical moving tower with adaptive blurring.
Figure 17:
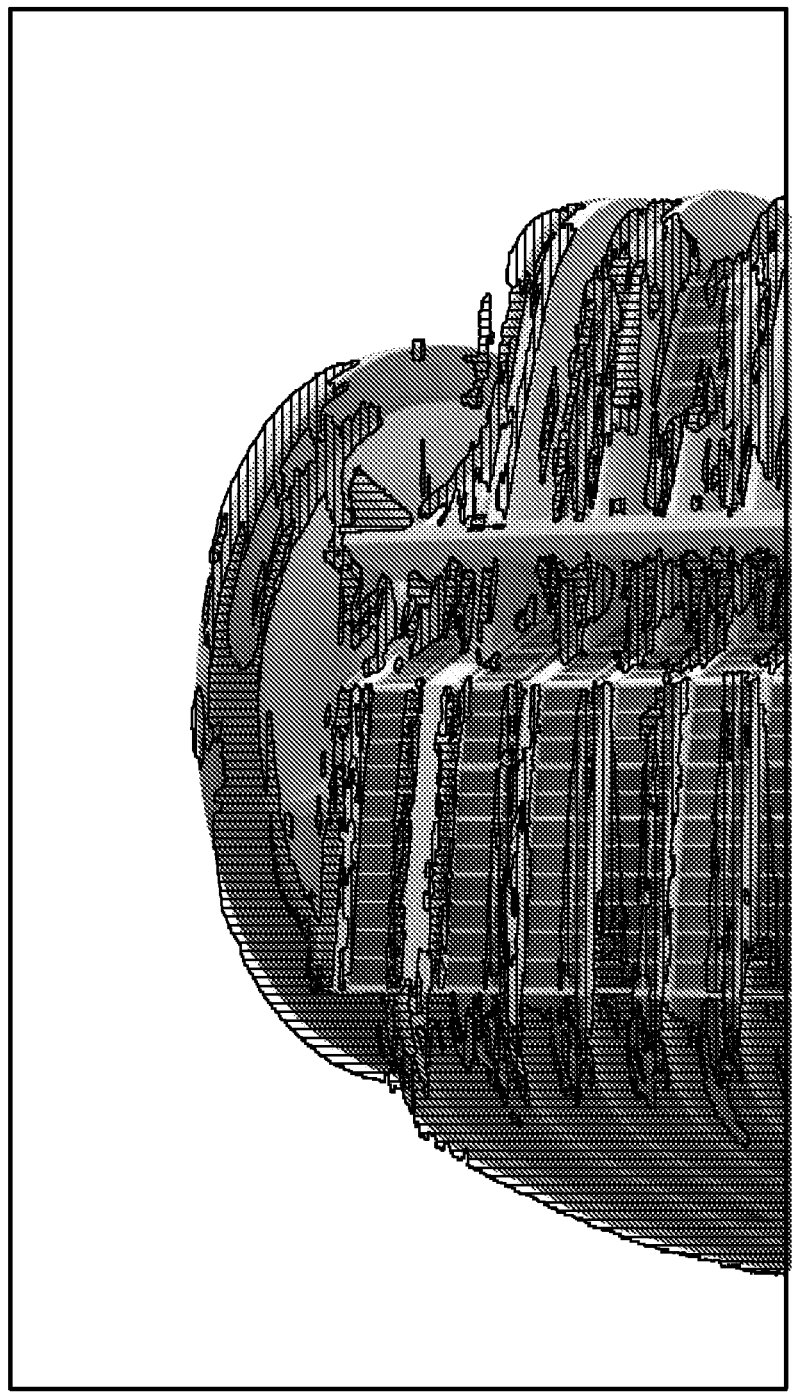
FIG. 17 shows a tower sequence with vector hatching overlay (horizontal hatching representing motion to the right, vertical hatching representing motion to the left)

FIG. 16 shows the sequence of a vertical moving tower by using adaptive blurring. FIG. 17 shows a tower sequence with vector color overlay wherein horizontally hatched areas denote a motion to the right and vertically hatched areas denote a motion to the left.

Using Existing Line Memories for Integrated MEMC:

On-Chip solutions for video processing which are Memory based have already existing internal Line Buffers, which carry video data from the previous and current field or frame. These line buffers can be located e.g. within temporal noise reductions or de-interlacing units, which operate motion adaptive. With the proposed line-based motion estimation and motion compensation these line buffers can be reused. For that purpose and in order to reduce the motion judder artefact from movie sources, a movie detector which indicates the current interpolated sequence of pull down mode A line buffer selector transfers the video signal data to the motion estimation according to the previous and the current input. This technique prevents additional bandwidth for the temporal up-conversion process. Therefore, the area consumption for the motion estimation and the motion compensation can be reduced to a minimum.

Figure 18:
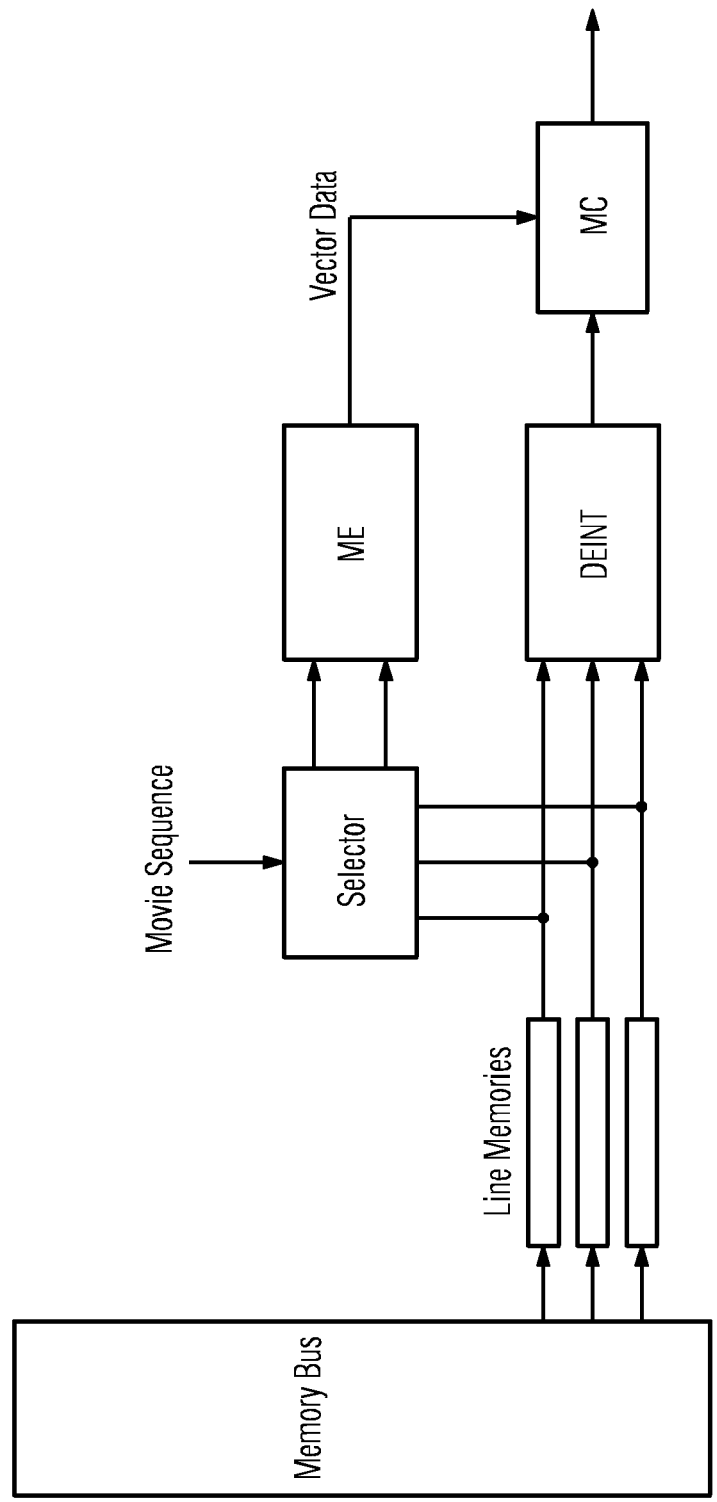
FIG. 18 shows an example for use of existing de-interlacer line memories.

FIG. 18 shows a block diagram of a system for processing video signals. This system comprises a de-interlacer device (DEINT). This de-interlacer device DEINT uses three line memories coupled on their input side to the memory bus and providing at their output side line data. This line data provided by the line memories is processed within the deinterlacer device and then provided to the motion compensation device MC. According to the present invention, these line memories are additionally used also for the motion estimation device. For this purpose, the system additionally comprises a selector device, where a movie sequence is provided to this selector device. This movie sequence may be then stored in an external memory via the memory bus and can be read out from this external memory by the line memories. For an IMC operation, this data stored in the line memories of the de-interlacer device DENT can be also used for motion estimation and motion compensation. For this purpose the data stored in the line memories is then provided as well to the motion estimation device ME and the motion compensation device.

Figure 19:
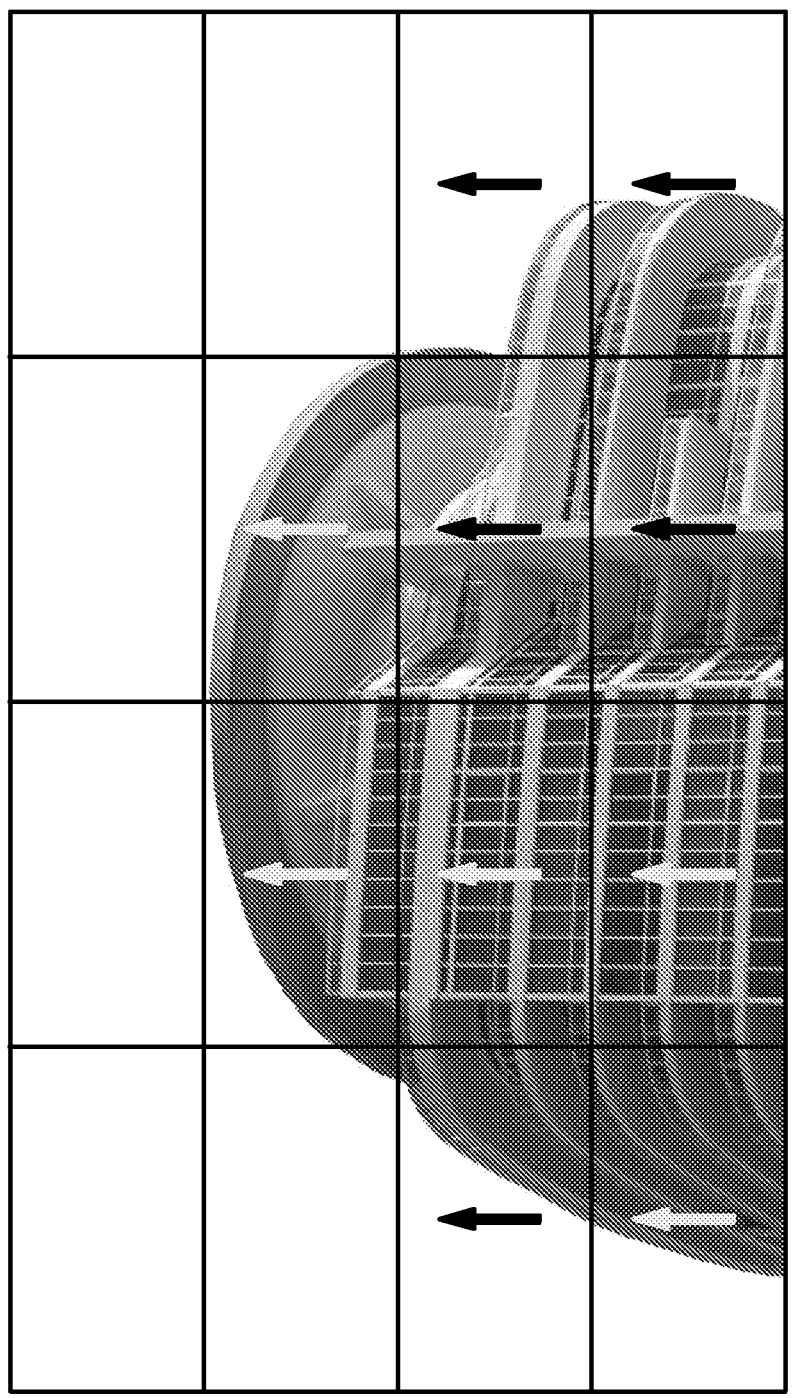
FIG. 19 shows a splitting the picture into regions to derive vertical motion for each region.

Vertical Motion Measurement by Line (Horizontal Data) Accumulation:

For vertical motions the algorithm can not compensate this motion. However, the occurrence of vertical motions can be used to reduce the compensation in same regions of the picture. FIG. 19 shows splitting or dividing of a motion picture into different regions to derive vertical motion for each region. Therefore, the luminance values of the lines in the region will be summed and stored for each line individually. This results in an accumulated vertical profile for a certain region of the picture. The whole picture can be divided into smaller regions to derive a vertical motion for each of these regions.

The summation of luminance values for each line of a region is performed for both the current frame and the previous frame. Thus, a current accumulation profile and a previous accumulation profile are derived, wherein the first entry of an accumulation profile comprises the sum of luminance values of the first line and each next entry of the accumulation profile comprises the sum of luminance values of the corresponding next line. The last entry of the accumulation profile will comprise the sum of luminance values of the last line of the corresponding region of the corresponding frame.

Figure 20:
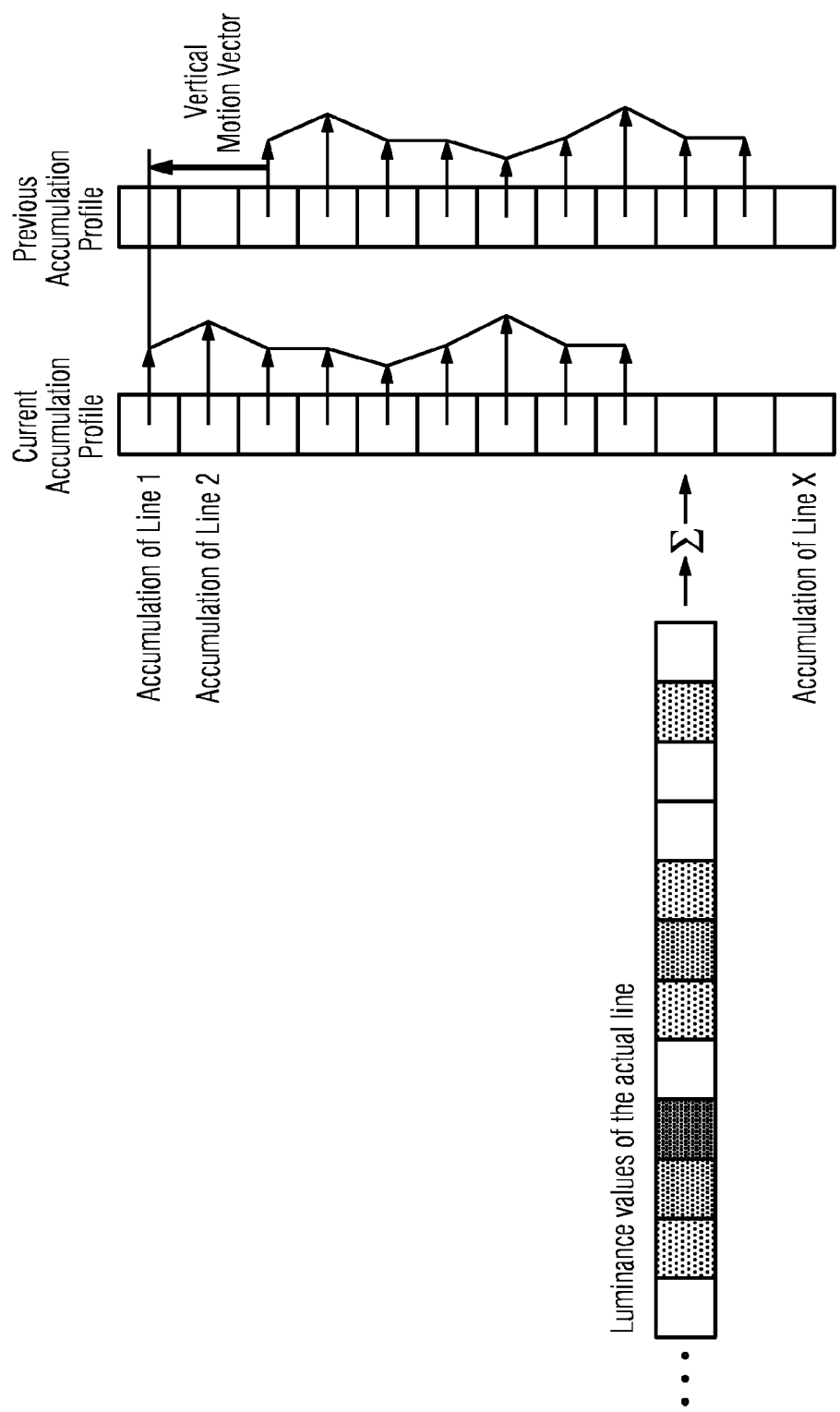
FIG. 20 shows a schematic principle of the line accumulation, profile matching and vector estimation.

FIG. 20 shows the schematic principle of the line accumulation, profile matching and vector estimation.

Storing for each region the accumulated profile of the previous and the current pictures enables the opportunity to measure the vertical motion by performing a similar estimation and matching process as described on the horizontal lines, but now applied on the current and previous accumulation profile.

The adequate application of motion estimation and motion compensation described by example of horizontal motions is applicable also to the horizontal motions as the accumulation profiles derived by summation of luminance values of lines represent lines of values, which can be treated as lines described above.

Thus, in case of vertical motion estimation and compensation summed luminance values of a number of lines (e.g. 9 lines) of a region of a current frame may be selected around a central line of the at least one region of a current frame in the current accumulation profile as a subprofile of the current accumulation profile. In a next step the selected subprofile will matched in the previous accumulation profile. In order to derive the true motion, the selected subprofile will be shifted over the search range of the vertical motion in the previous accumulation profile.

Also here, assuming the motion of the objects in the scene will be constant from frame to frame and the objects are larger than a group of lines (e.g. 9 lines), the matching process can be performed more efficiently if only a set of vector candidates are checked for a matching accumulation profile. Thus, also here a set of vector candidates derived from the previous accumulation profile can be used for the matching, as already described above.

Here, it has to be noted that, the motion estimation and the matching process using selected vectors can be applied adequately for the vertical motion estimation and compensation. Therefore, it has been abandoned, to provide a repeated explanation of the equal performance for the horizontal case to avoid redundancy of description.

Thus, by performing a vertical motion estimation and compensation, a global vertical motion vector can be derived for the corresponding picture region. The larger the vertical motion is the less reliable will be the horizontal compensation and will be turned off by inserting a zero vector into the vector field.

HALO Reduced Upconversion:

For the upconversion regarding 100/120-Hz LCD-panels a methodology which sharpens the first frame of the up-converted video stream and the second frame will be blurred. This methodology known as Dynamic Frame Insertion (DFI) or Smooth Frame Insertion (SFI) shows the advantage to perform the up-conversion without introducing an artefact. This technique is also known as "HALO". These "HALO"—artifacts are often found in connection with motion estimation and motion compensation around moving objects.

Figure 21:
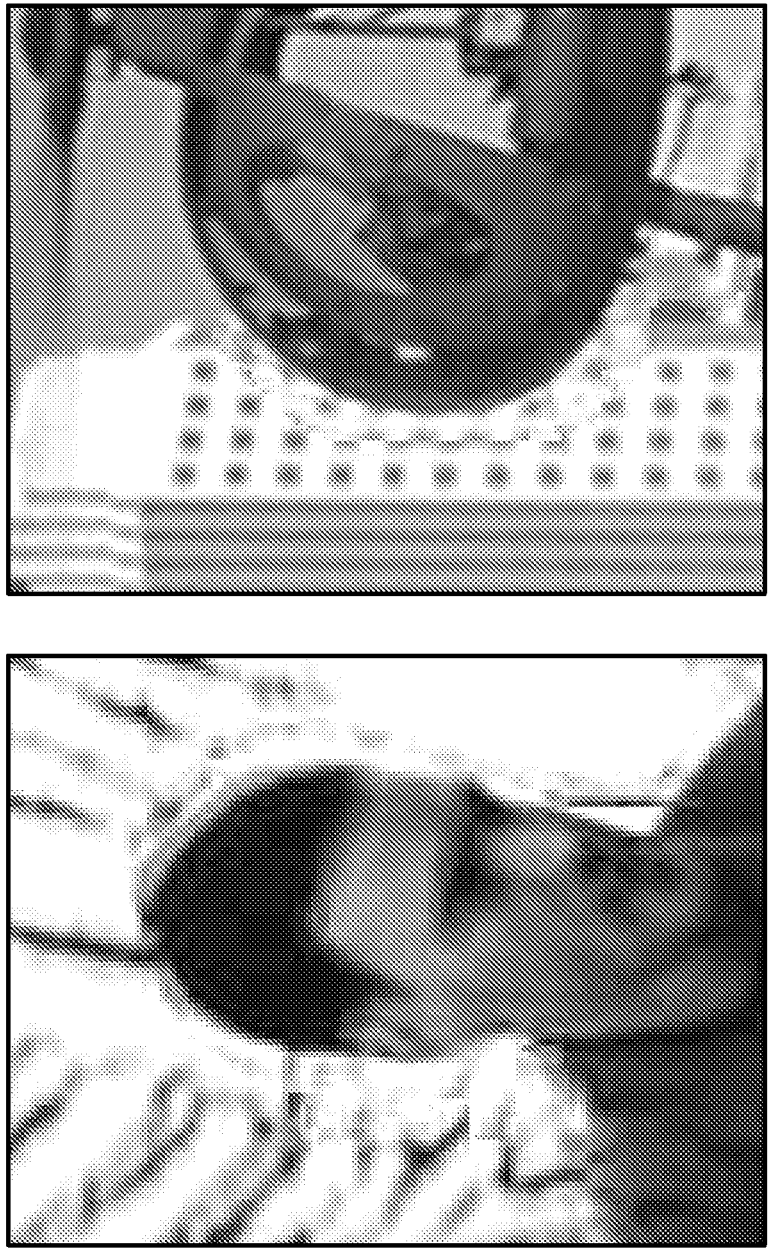
FIG. 21 shows an example of HALO-Artefacts in motion compensated scenes.

Also other up-conversion methods like Grey Frame Insertion (GFI) perform a HALO-free up-conversion. FIG. 21 shows an example of HALO-Artefact in motion compensated scenes.

The DFI-Algorithm avoids this type of artifact. Unfortunately the DFI is not even not very good suitable for an up-conversion on the whole range of luminance levels. For black and white parts the DFI-algorithm fails and a luminance adaptive fader switch over from the peaked/blurred picture to the original input picture. This is very annoying and disturbing especially in regions of news tickers, where these regions of high contrast occurs, the DFI-algorithm can not remove the motion blurring of LC-Displays.

Figure 22:
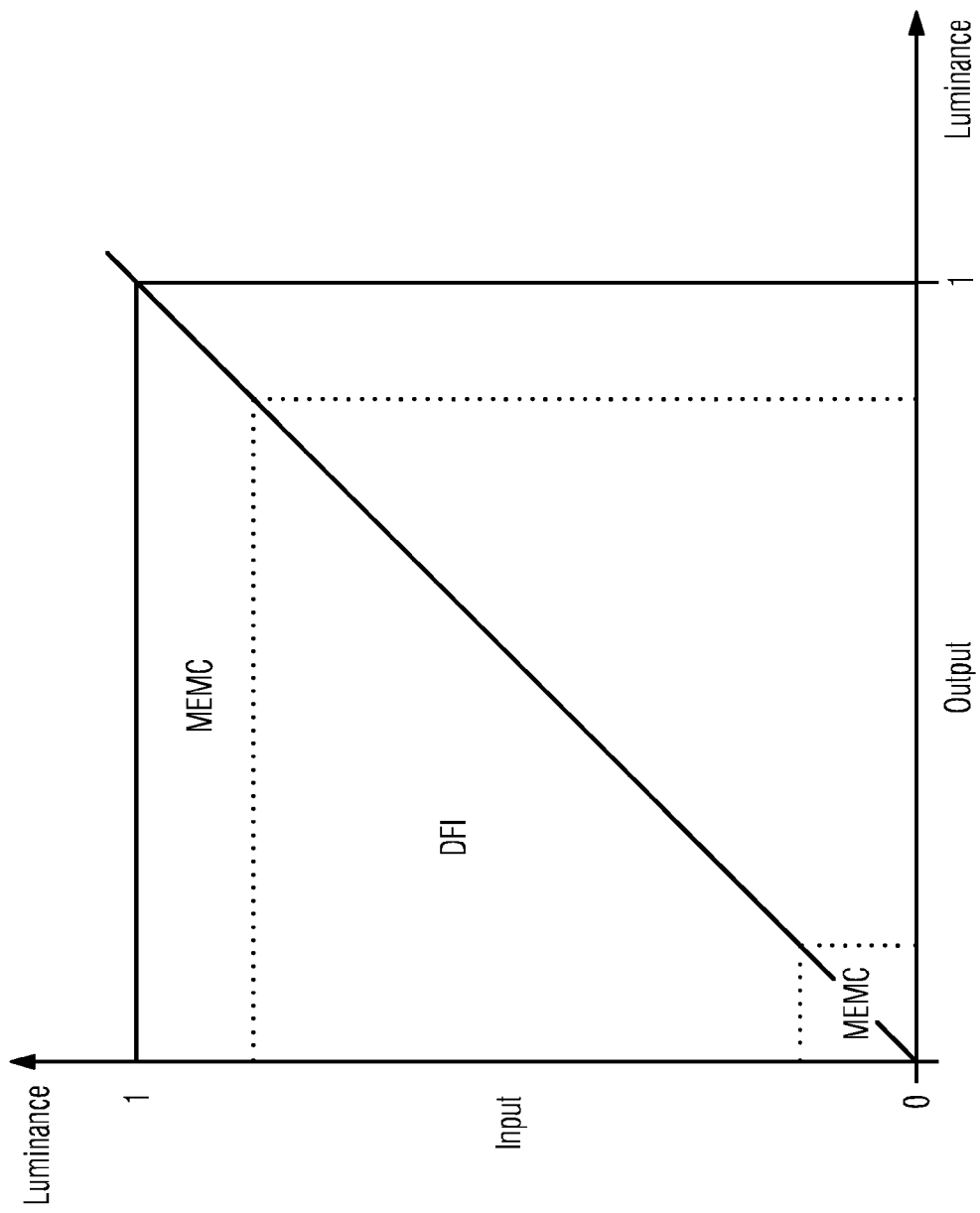
FIG. 22 shows a luminance Input/Output-Diagram showing regions where adaptively Motion Estimation and motion Compensation has to be applied in the second Frame N2.

FIG. 22 shows a luminance Input/Output Diagram showing regions where MEMC and DFI are applied. In order to keep the advantage of the HALO-free up-conversion of the DFI and to combine the possibility to compensate for motion blurring in the high contrast regions, a motion estimation and motion compensation can be used adaptively for the mostly black and/or white regions of a picture.

Figure 23:
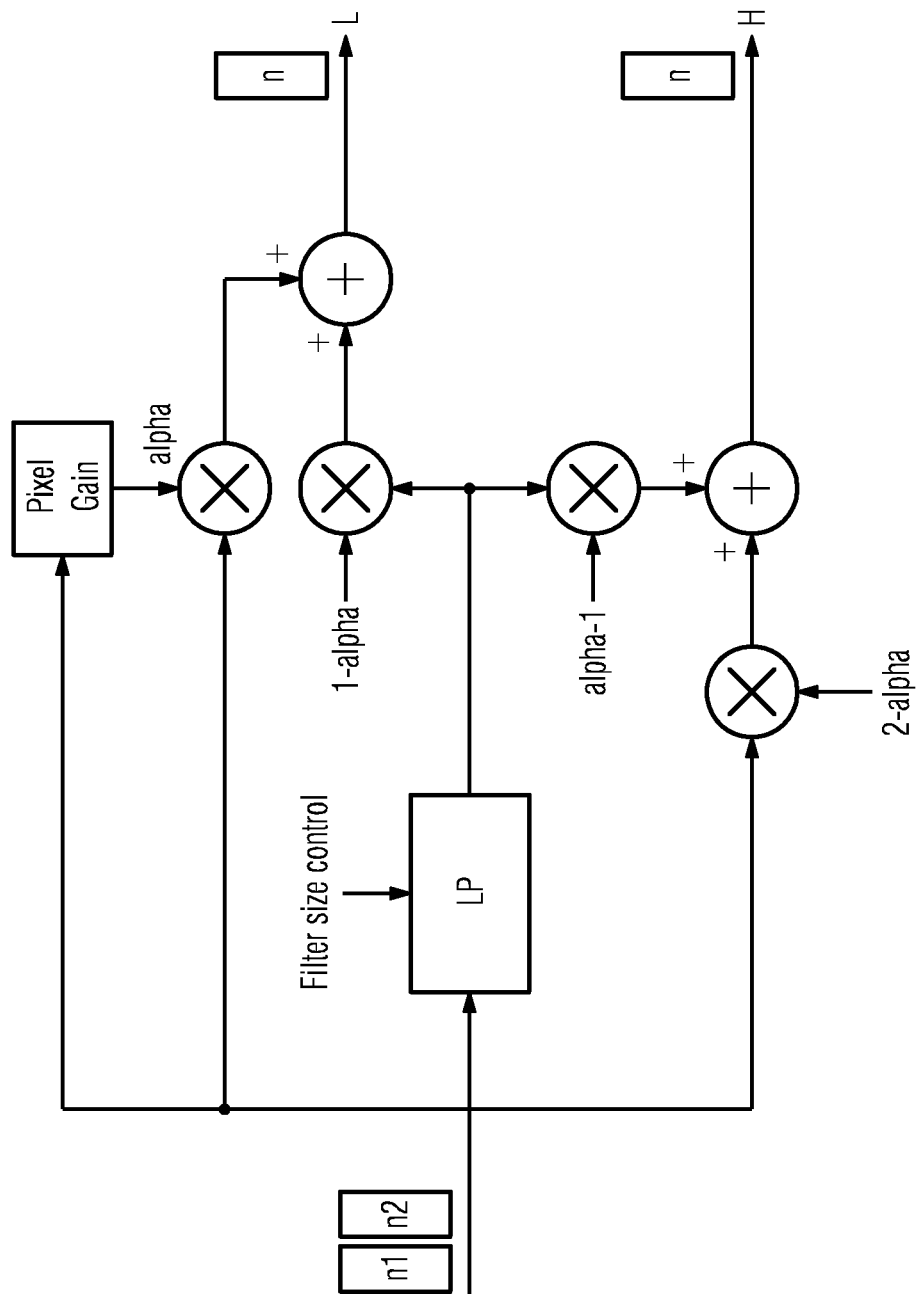
FIG. 23 shows a block Diagram to illustrate the DFI principle, where depending on the Pixel Gain the alpha value fade between input and peaked/blurred output (the frame N2 will be the adaptively temporal up converted Frame)

FIG. 23 shows a block diagram illustrating the DFI principle, where depending on the Pixel Gain the alpha value fade between input and peaked/blurred output. The frame N2 will be the adaptively temporal up converted Frame. For DFI the frame or field up conversion will be done by a simple frame doubling, by reading out the frame memory twice on double speed. The first frame will be sharpened, the second will be blurred. For the compensation in the high contrast regions it is beneficial to apply adaptively on the second frame, only in these high contrast regions the motion compensated picture.

Figure 24:
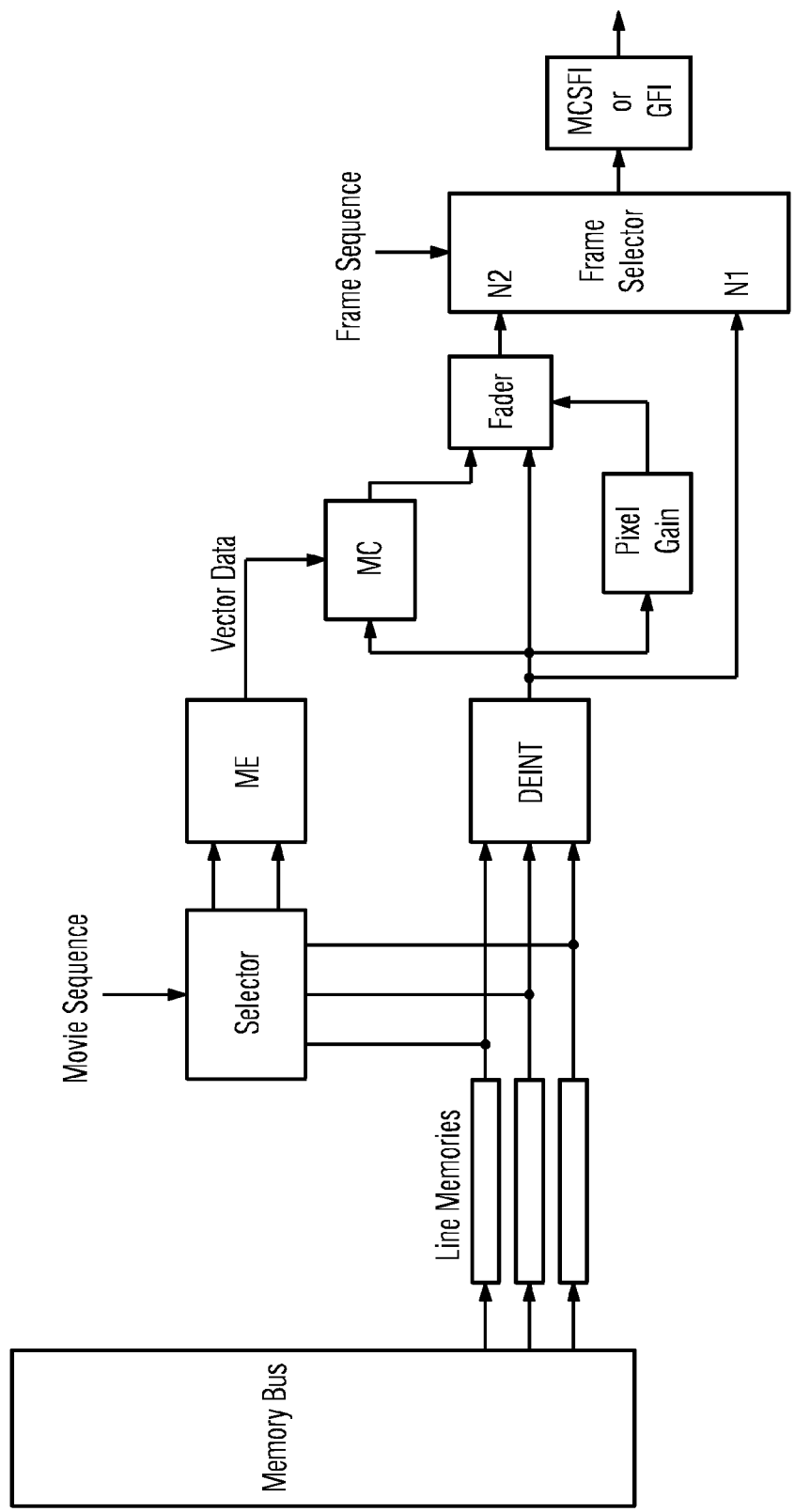
FIG. 24 shows a block diagram for combination of line based MEMC with non-vector based-up conversion methods like MCSFI and GFI.

FIG. 24 shows a block diagram for the combination of line based MEMC with non-vector based up-conversion methods like MCSFI and GFI.

Thus, the present invention is related to line based vertical motion estimation and vertical motion compensation in consecutive frames of a motion picture, wherein the picture is divided in at least one region, and wherein: in a first summation luminance values for each line of the at least one region of a previous frame are summed, wherein the first summation of luminance values results in a previous accumulation profile; in a second summation of luminance values of for each line of the at least one region of a current frame are summed, wherein said second summation of luminance values results in a current accumulation profile; and wherein a vertical motion vector is derived by use of the previous accumulation profile and of the current accumulation profile.

While embodiments and applications of this invention have been shown and described above, it should be apparent to those skilled in the art, that many more modifications (than mentioned above) are possible without departing from the inventive concept described herein. The invention, therefore, is not restricted except in the spirit of the appending claims. It is therefore intended that the foregoing detailed description is to be regarded as illustrative rather than limiting and that it is understood that it is the following claims including all equivalents described in these claims that are intended to define the spirit and the scope of this invention. Nor is anything in the foregoing description intended to disavow the scope of the invention as claimed or any equivalents thereof.

It is also noted that the above mentioned embodiments and examples should be understood to be only exemplary. That means that additional system arrangements and functional units and operation methods and standards may be implemented within the MEMC-system.

Additionally, it has to be pointed out that the vertical motion estimation and compensation, described in more detail as an extension of the horizontal motion estimation and compensation, can be performed independently of the horizontal motion estimation and compensation as well as in further situation dependent cases in appropriate combination with the horizontal motion estimation and compensation, for example, before or in arbitrary combination with the horizontal motion estimation and compensation.

USED ABBREVIATIONS AND DEFINITIONS

ME: motion estimation
MC: motion compensation
MEMC: motion estimation and motion compensation
SAD: Sum of the absolute difference
DFI: Dynamic Frame Insertion (i.e. up-conversion method to double the incoming frame rate of a video sequence)
GFI: Grey Frame Insertion (i.e. up-conversion method to double the incoming frame rate of a video sequence)
MCSFI: Motion Controlled Smooth Frame Insertion (i.e. up-conversion method which is motion detector controlled)
SFI: Smooth Frame Insertion (i.e. up-conversion method to double the incoming frame rate of a video sequence)
DEINT: Deinterlacing (i.e. converting a field represented video data stream into a frame represented)
Line Memory: an embedded memory of a size of one video line or at least less of the incoming or actually processing video signal stream
Field: a video image which comprises either odd or even lines
Frame: a video image comprising of the complete video information for one picture

What is claimed is:

1. A method for providing line based vertical motion estimation and vertical motion compensation in consecutive frames of a motion picture, wherein the picture is divided in at least one region, the method comprising:
  a first summing of luminance values for each horizontal line of the at least one region of a previous frame, wherein said first summing of luminance values results in a previous accumulation profile;
  a second summing of luminance values for each horizontal line of the at least one region of a current frame, wherein said second summing of luminance values results in a current accumulation profile; and
  deriving a vertical motion vector by use of the previous accumulation profile and of the current accumulation profile, wherein the deriving a vertical motion vector comprises:
    selecting summed luminance values of a number of horizontal lines of the a least one region of said current frame around a central line of the at least one region of said current frame in the current accumulation profile as a subprofile of the current accumulation profile, and
    matching the subprofile of the current accumulation profile in the previous accumulation profile.

2. The method according to claim 1, wherein data of the previous frame is derived from a first line memory and data of the current frame is derived from a second line memory.

3. The method according to claim 2, wherein at least one of the first line memory and the current line memory is further used in at least one of the following: a deinterlacer application and a temporal noise reduction application.

4. The method according to claim 1, wherein a set of vector candidates derived from the previous accumulation profile is used in the matching.

5. An apparatus for providing line based vertical motion estimation and vertical motion compensation in consecutive frames of a motion picture comprising:
  a first processing unit configure to perform a first summing of luminance values for each horizontal line of the at least one region of a previous frame, wherein said first summing of luminance values results in a previous accumulation profile;
  a second processing unit configured to perform a second summing of luminance values for each horizontal line of the at least one region of a current frame, wherein said second summing of luminance values results in a current accumulation profile; and
  a third processing unit configures to derive a vertical motion vector by use of the previous accumulation profile and of the current accumulation profile, wherein the third processing unit is configured to drive the vertical motion vector by:
    selecting summed luminance values of a number of horizontal lines of the at least one region of said current frame around a central line of the at least one region of said current frame in the current accumulation profile as a subprofile of the current accumulation profile, and
    matching the subprofile of the current accumulation profile in the previous accumulation profile.

6. The apparatus according to claim 5, wherein the apparatus comprises a first line memory for storing data of the previous frame and a second line memory for storing data of the current frame.

7. The apparatus according to claim 6, wherein at least one of the first line memory and the current line memory is configured to be used in at least one of the following: a deinterlacer application or temporal noise reduction application.

8. A computer program product comprising a non-transitory computer usable medium having a computer readable program code embodied therein, said code being configured to implement a method for providing line based vertical motion estimation and vertical motion compensation in consecutive frames of a motion picture, wherein the picture is divided in at least one region, the method comprising:
- a first summing of luminance values for each horizontal line of the at least one region of a previous frame, wherein said first summing of luminance values results in a previous accumulation profile;
- a second summing of luminance values for each horizontal line of the at least one region of a current frame, wherein said second summing of luminance values results in a current accumulation profile; and
- deriving a vertical motion vector by use of the previous accumulation profile and of the current accumulation profile, wherein the deriving a vertical motion vector comprises:
  - selecting summed luminance values of a number of horizontal lines of the at least one region of said current frame around a central line of the at least one region of said current frame in the current accumulation profile as a subprofile of the current accumulation profile, and
  - matching the subprofile of the current accumulation profile in the previous accumulation profile.

9. The computer program product according to claim 8, said computer program product being comprised in a data carrier.

* * * * *